(12) United States Patent
Zhang et al.

(10) Patent No.: US 10,855,200 B2
(45) Date of Patent: Dec. 1, 2020

(54) HIGH POWER GRID SYSTEM WITH THYRISTOR CONTROLS

(71) Applicant: The University of Birmingham, Birmingham (GB)

(72) Inventors: Xiao-Ping Zhang, Birmingham (GB); Ying Xue, Birmingham (GB)

(73) Assignee: The University of Birmingham

(*) Notice: Subject to any disclaimer, the term of this patent is extended or adjusted under 35 U.S.C. 154(b) by 0 days.

(21) Appl. No.: 16/489,682

(22) PCT Filed: Mar. 1, 2018

(86) PCT No.: PCT/GB2018/050533
§ 371 (c)(1),
(2) Date: Aug. 28, 2019

(87) PCT Pub. No.: WO2018/158581
PCT Pub. Date: Sep. 7, 2018

(65) Prior Publication Data
US 2020/0052611 A1 Feb. 13, 2020

(30) Foreign Application Priority Data
Mar. 3, 2017 (GB) .................................. 1703427.3

(51) Int. Cl.
*H02M 7/483* (2007.01)
*H02M 7/519* (2006.01)
(Continued)

(52) U.S. Cl.
CPC ........... *H02M 7/483* (2013.01); *H02M 7/519* (2013.01); *H02M 7/521* (2013.01); *H02M 7/7575* (2013.01)

(58) Field of Classification Search
None
See application file for complete search history.

(56) References Cited

U.S. PATENT DOCUMENTS 5,949,664 A * 9/1999 Bernet .................... H02M 1/34
363/34
6,125,045 A 9/2000 Nishikawa et al.
(Continued)

FOREIGN PATENT DOCUMENTS

| CN | 105634026 | 6/2016 |
|---|---|---|
| CN | 105656339 | 6/2016 |

(Continued)

*Primary Examiner* — Jeffrey A Gblende
(74) *Attorney, Agent, or Firm* — Wells St. John P.S.

(57) ABSTRACT

A line commutated converter (LCC) for a high voltage direct current power converter, the LCC comprising at least one LCC bridge circuit for connection to at least one terminal of a DC system, each bridge circuit comprising a plurality of arms, each associated with a respective phase of an AC system, each arm comprising: an upper thyristor valve or valves, and lower thyristor valve or valves connected in series; an associated branch extending from between the upper and lower thyristors; and at least one thyristor-based capacitor module for each phase, each module comprising a plurality of module thyristors, the or each capacitor module operable to insert a main capacitor into the respective arm of the bridge circuit by firing at least one or more of said module thyristors.

30 Claims, 12 Drawing Sheets

(51) Int. Cl.
*H02M 7/521* (2006.01)
*H02M 7/757* (2006.01)

(56) References Cited

U.S. PATENT DOCUMENTS

| | | | |
|---|---|---|---|
| 7,262,982 B2 | 8/2007 | Kurosawa | |
| 10,305,370 B2 | 5/2019 | Zhang et al. | |
| 2007/0133235 A1* | 6/2007 | Kurosawa | H02J 3/1807 |
| | | | 363/50 |
| 2014/0226373 A1* | 8/2014 | Park | H02M 1/12 |
| | | | 363/35 |
| 2018/0159421 A1 | 6/2018 | Zhang et al. | |

FOREIGN PATENT DOCUMENTS

| | | |
|---|---|---|
| EP | 0982843 | 3/2000 |
| EP | 1962414 | 8/2008 |
| EP | 2975752 | 1/2016 |
| GB | 1703427.3 | 7/2017 |
| WO | WO 2014/075614 | 5/2014 |
| WO | WO 2016/177991 | 11/2016 |
| WO | WO PCT/GB2018/050533 | 5/2018 |
| WO | WO PCT/GB2018/050533 | 9/2019 |

\* cited by examiner

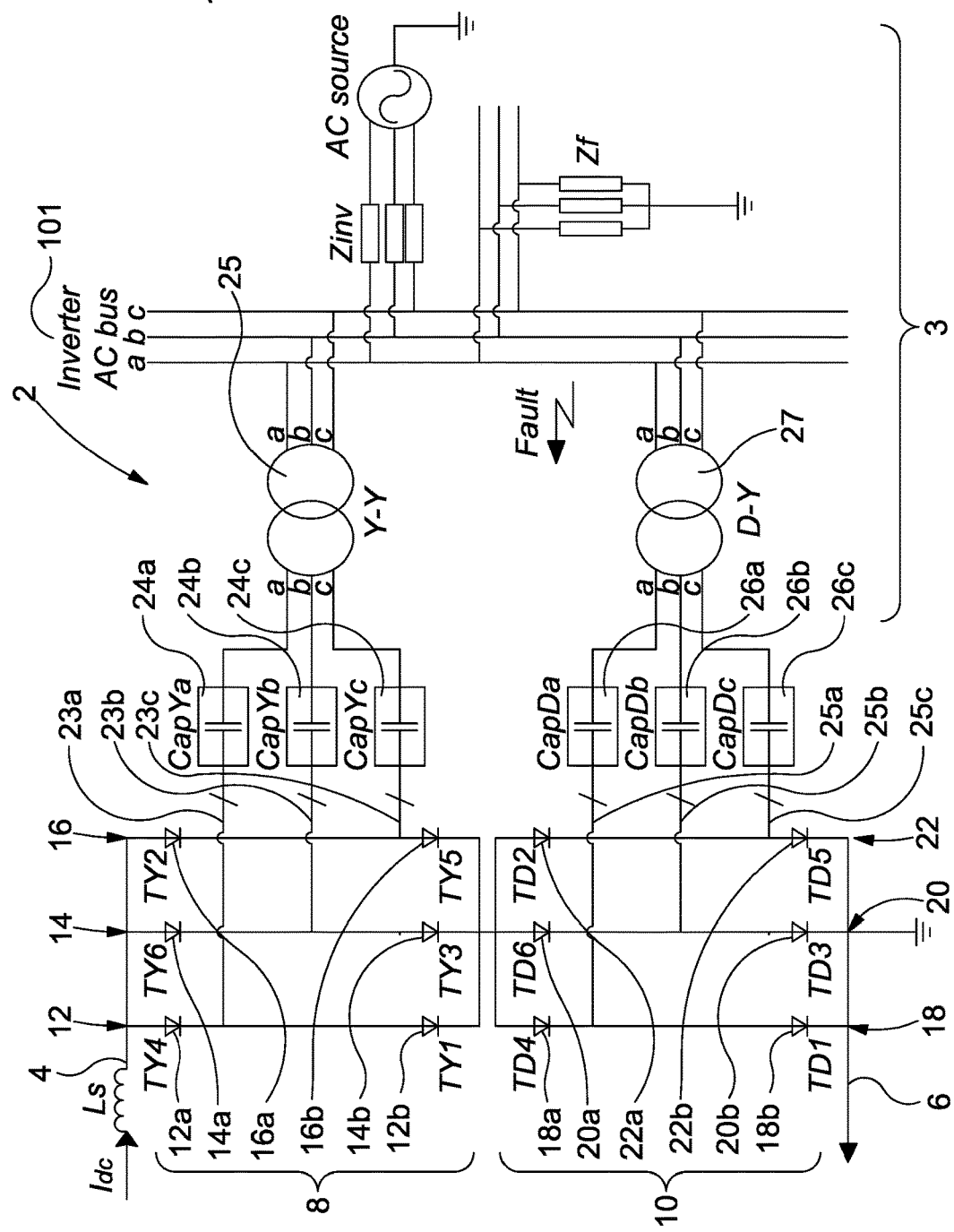
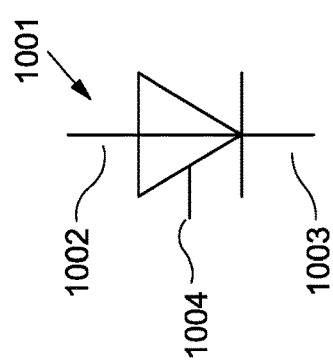
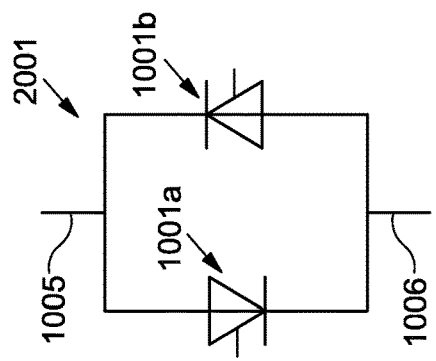
Figure 1a
Figure 1b
Figure 1c

HIGH POWER GRID SYSTEM WITH THYRISTOR CONTROLS

RELATED PATENT DATA

This application is a 35 U.S.C. § 371 of and claims priority to PCT International Application Number PCT/GB2018/050533, which was filed 1 Mar. 2018 (1 Mar. 2018), and was published in English, which claims priority to GB Patent Application No. 1703427.3, which was filed 3 Mar. 2017 (Mar. 3, 2017), the teachings of which are incorporated herein by reference.

FIELD OF THE INVENTION

The present invention relates to power converters, and more particularly to line commutated converters (LCC) for use in high-voltage, Direct Current (HVDC) systems, and the elimination of commutation failures & control of reactive power/AC voltage therein.

BACKGROUND

In a high-voltage, direct current (HVDC) electric power transmission system, direct current (DC) is used for the bulk transmission of electrical power. DC is often preferred for transmitting electric power over long distances, as electrical losses are lower than in corresponding AC transmission systems. Among all the commonly used HVDC technologies, LCC-HVDC has the lowest losses due to the use of thyristors. Also, DC transmission line costs over long distances are lower. This is because DC requires smaller conductor area than AC, as there is no need to support three phases and there is no skin effect. In addition, LCC-HVDC has the lowest converter station cost. This is mainly because the much lower cost of thyristors compared with other power electronic switches.

In HVDC, AC is converted to DC (rectification) and reconverted back to AC afterwards (inversion). Typically, line commutated converters (LCC) or voltage source converters (VSC) are used for rectification and inversion. LCC systems are often preferred to VSC systems, as larger power can be transmitted with lower losses using LCC. The maximum power of a VSC system is limited by the power handling capability of power electronic devices. Some examples of power electronic devices include IGBTs (Insulated Gate Bipolar Transistors), IGCTs (Integrated Gate-Commutated Thyristors), GTOs (Gate Turn-off Thyristors), MOSFETs (Metal-Oxide-Semiconductor Field-Effect Transistors), IEGT (Injection-Enhanced Gate Transistor), etc. Recently, LCC-HVDC systems have been used to transmit up to 12 GW of electric power.

However, VSC HVDC systems typically employ transistors such as IGBTs, IGCTs, GTOs, MOSFETs, IEGTs, etc which can have Gate-Turn-Off capability and can be switched on and off, while LCCs employ thyristors (more precisely thyristor valves) which can only be switched on. A thyristor valve begins conducting when it is forward biased and its gate terminal receives a current trigger, and will continue to conduct until it is no longer forward biased and its conduction current decreases to zero. Because of this, LCC-HVDC systems are susceptible to commutation failure during faults on the AC side. As will be understood by the skilled reader, commutation is the process of switching conduction of the DC current from one thyristor valve arm associated with one AC phase to another thyristor valve arm associated with another AC phase. Commutation failure can mean that even after the fault has been cleared, the system may need to be shut down and restarted, potentially leading to blackout.

In addition to this, in LCC HVDC systems, because of the time at which the commutation starts and the duration of the commutation, the current at the AC side of converter lags the voltage, and the system consumes reactive power. This is different from VSCs, which can produce or consume reactive power on demand.

WO2016/177991A1 (having the same Applicant as the present application) discloses an LCC-HVDC system that eliminates commutation failure and provides for dynamic reactive power control. The system uses capacitor modules operable to insert capacitors into arms of a bridge circuit. The hardware used to realise these advantages limits factors such as power rating, power loss, low-cost and reliability.

The present invention has been devised with the foregoing in mind.

SUMMARY

According to a first aspect of the present invention, there is provided a line commutated converter, LCC, for a high-voltage, direct current, HVDC, power converter. The LCC comprises at least one bridge circuit for connection to at least one terminal of a DC system. Each bridge circuit comprises a plurality of arms, and each arm is associated with a respective phase of an AC system. Each arm comprises an upper thyristor valve or valves, and lower thyristor valve or valves connected in series, an associated branch extending from between the upper and lower thyristor valve/valves, and at least one thyristor-based capacitor module comprising a plurality of module thyristors for each phase. The, or each thyristor-based capacitor module is operable to insert a capacitor from the respective arm of the bridge circuit by firing at least one of said module thyristors.

It will be appreciated that the thyristor functionality may be provided by a single thyristor valve or by two or more thyristor valves suitably arranged in the circuitry. The use of thyristor-based capacitor modules is particularly advantageous over existing LCC-HVDC systems where IGBTs may be used in capacitor modules to insert capacitors. Examples of the advantages of thyristors are as follows:

Thyristors have higher current/voltage ratings than IGBTs. This is of significant importance for high power LCC-HVDC systems where the DC current may be rated at more than 3 kAmps. It is not possible to use IGBTs for such applications since they are typically rated at not more than 2.5 kAmps. In contrast, thyristors may be rated at 6 kAmps or more.

Thyristors suffer less power loss compared to IGBTs. Therefore there is a significant economic gain on bulk power application of LCC-HVDC systems.

Thyristors are cheaper than IGBTs resulting in lower equipment costs.

Thyristors are more reliable than IGBTs and employ more mature technology.

The current rating of the thyristor-based capacitor module(s) may be as high as that of the thyristor valves.

The thyristor-based capacitor module(s) may be in either a half-bridge configuration or a full-bridge configuration.

Each half-bridge capacitor module may further comprise at least one one-directional component, each one-directional component forming the arm of a half-bridge circuit, the output of the main capacitor being applied to the module half-bridge circuit and to circuitry external to the capacitor module.

Each full-bridge capacitor module may further comprise at least four one-directional components. These one-directional components may form the arms of a full-bridge circuit, the output of the main capacitor being applied to the module full-bridge circuit and to circuitry external to the capacitor module.

Each thyristor-based capacitor module may further comprise a main capacitor, a plurality of subsidiary capacitors, and a plurality of inductors. The subsidiary capacitors and inductors may be operable to form a plurality of at least two L-C oscillation circuits within the thyristor-based capacitor module.

Each L-C oscillation circuit may comprise a module thyristor being a bypass thyristor, a subsidiary capacitor, and an inductor. Each L-C oscillation circuit may be parallel to a respective one-directional electronic component. This one-directional electronic component may be biased opposite the respective bypass thyristor.

The one-directional electronic component may be a diode.

The one-directional electronic component may be a thyristor. In this case, use of a thyristor as the one-directional electronic component results in the advantages of using thyristors as discussed above being made more widely realised in the system.

Each bypass thyristor may be operable to allow current to bypass the arm of the bridge circuit (full-bridge or half-bridge) that is parallel to said bypass thyristor.

Each L-C oscillation circuit may be operable to generate a current oscillation that causes the bypass thyristor of the respective L-C oscillation circuit to be switched off.

The LCC may further comprise a first subsidiary module thyristor associated with each L-C oscillation circuit, said first subsidiary module thyristor being operable to switch off the bypass thyristor of the respective oscillation circuit when fired by causing a current oscillation in the respective L-C oscillation circuit.

The use of an L-C oscillation circuit to switch off the bypass thyristor is particularly advantageous since it allows for the state of the bypass thyristor to be controlled using another thyristor (i.e the first subsidiary module thyristor). This ensures that arms of the bridge within the capacitor module can be bypassed by switching thyristors. The insertion of the main capacitor (or switching of the polarity of the main capacitor) can be accomplished merely by switching thyristors on despite the inherent limitation of thyristors that they cannot be actively switched off without reducing the amount of current flowing through them. This limitation of thyristors means that components that can be actively switched on and off such as IGBTs used in capacitor modules of prior art LCCs cannot simply be replaced with thyristors whilst maintaining the same circuit topology. The numerous advantages associated with the use of thyristors discussed above may therefore be realised.

The LCC may further comprise a second subsidiary module thyristor associated with each L-C oscillation circuit, said second subsidiary module thyristor being operable to charge the subsidiary capacitor of the respective L-C oscillation circuit by allowing current to flow to said subsidiary capacitor when fired. Charging of the subsidiary capacitor is necessary to allow the L-C oscillation to take place when the first subsidiary module thyristor is fired.

The LCC may comprise at least one full-bridge configured thyristor-based capacitor module operable to insert a main capacitor in either polarity into at least one arm of the bridge circuit.

The LCC may comprise at least one full-bridge configured thyristor-based capacitor module operable to switch the polarity of the main capacitor by firing one or more thyristors.

Multiple thyristor-based capacitor modules may be in series connection with one or more arms.

The LCC may comprise a mixture of thyristor-based capacitor modules, and, IGBT-based capacitor modules such as those disclosed in WO2016/177991A1. At least one thyristor-based capacitor module may be in series connection with at least one IGBT-based capacitor module.

The LCC may comprise capacitor modules based on any of IGCTs, GTOs, MOSFETS, IEGTs. At least one thyristor-based capacitor module may be in series connection with a capacitor module based on any of IGCTs, GTOs, MOSFETs, IEGTs.

Each of the upper and lower thyristor valves may be a bi-directional thyristor valve, wherein each bi-directional thyristor valve comprises first and second bi-directional component thyristors arranged in an anti-parallel configuration, and wherein each bi-directional thyristor valve is operable to allow current to flow across the bi-directional thyristor valve in any direction thereby providing for the direction of current flowing through the plurality of arms to be switched.

In a second aspect of the invention there is provided a method of operating a line commutated converter, LCC, for a high-voltage, direct current, HVDC, converter, wherein the LCC comprises at least one bridge circuit for connection to at least one terminal of a DC system, each bridge circuit comprising a plurality of arms, each associated with a respective phase of an AC system, each arm comprising:
  an upper thyristor valve or valves, and a lower thyristor valve or valves connected in series;
  an associated branch extending from between the upper and lower thyristor valve/valves; and
  at least one thyristor-based capacitor module for each phase.

When the thyristor-based capacitor module has a full bridge topology, the method may comprise the step of inserting, by the or each thyristor-based capacitor module, a main capacitor into the respective arm of the bridge circuit.

The method may further comprise the step of firing one or more thyristors within the at least one thyristor-based capacitor modules in order to reverse the polarity of the main capacitor.

The method may further comprise the step of firing one or more first subsidiary thyristors within the at least one thyristor-based capacitor modules in order to switch off a bypass thyristor, thereby diverting current from an arm of a module bridge circuit within said thyristor-based capacitor module. The module bridge circuit may have a half-bridge or full bridge circuit topology.

The method may further comprise the step of firing at least one second subsidiary thyristor within the at least one thyristor-based capacitor modules in order to charge at least one subsidiary capacitor.

The method may further comprise the steps of firing the first subsidiary thyristor within the at least one thyristor-based capacitor modules in order to allow current to flow through an L-C oscillation circuit thereby generating an L-C oscillation, said L-C oscillation causing both the bypass thyristor and the first subsidiary thyristor to switch off.

The method may further comprise the step of firing one or more thyristors that are one-directional components forming arms of the module bridge circuit within the at least one thyristor-based capacitor module.

Each upper and lower thyristor valve may be a bi-directional thyristor valve, wherein each bi-directional thyristor valve comprises first and second bi-directional component thyristors arranged in an anti-parallel configuration. The method may further comprise switching the direction of current flowing through the plurality of arms by firing one of the first and second bi-directional component thyristors.

In a third aspect of the invention there is provided a method of switching of a thyristor based half-bridge capacitor module for use in commutation of a line commutated converter, LCC, wherein the capacitor module comprises a thyristor, a main capacitor, a plurality of auxiliary capacitors and a plurality of diodes, the method comprising:
(i) inserting the main capacitor into a main circuit loop at the instant of commutation start;
(ii) bypassing the main capacitor from the main circuit loop at the end of commutation;
(iii) reversing polarity of a first auxiliary capacitor;
(iv) firing the thyristor to form a current path;
(v) turning off the thyristor and inserting the main capacitor into the main circuit loop with a short lead time just before the start of commutation; and
(vi) reversing polarity of a second auxiliary capacitor.

The method may be modified in that the thyristor based half-bridge capacitor module does not include diodes but does include a plurality of additional thyristors, wherein the additional thyristors are fired at points where it is necessary for current to flow through them, including at step (v) when the main capacitor is inserted into the main circuit loop.

According to another aspect of the invention there is provided a method of switching a thyristor based full-bridge capacitor module for use in commutation of a line commutated converter, LCC, which comprises a converter transformer, wherein the capacitor module is connected to the LCC between a valve side and a secondary side of the converter transformer and comprises a main capacitor, at least four auxiliary capacitors and a plurality of diodes, the method comprising:
(i) initial charging of the main and auxiliary capacitors;
(ii) inserting the main capacitor into a circuit to provide an additional commutation voltage;
(iii) bypassing the main capacitor;
(iv) reversing the voltage polarity of a first of the auxiliary capacitors;
(v) inserting the main capacitor into the circuit with its negative polarity connected to the valve side;
(vi) reversing the voltage polarity of a second subsidiary capacitor;
(vii) inserting the main capacitor C into the circuit, with its negative side connecting to the valve side;
(viii) reversing the voltage polarity of a third subsidiary capacitor;
(ix) inserting the main capacitor into the circuit with its positive side connected to the valve side;
(x) reversing the voltage polarity of a fourth subsidiary capacitor The method may be, modified in that the thyristor based full-bridge capacitor module does not include diodes but does include a plurality of additional thyristors, wherein the additional thyristors are fired at points where it is necessary for current to flow through them.

BRIEF DESCRIPTION OF THE DRAWINGS

FIG. 1a is a circuit diagram showing a three-phase LCC inverter, according to an embodiment of the present invention.

FIG. 1b is a diagrammatical representation of a Single-Directional Thyristor Valve used in embodiments of the present invention.

FIG. 1c is a diagrammatical representation of a Bi-Directional Thyristor Valve used in embodiments of the present invention.

FIG. 2b is a circuit diagram showing an embodiment of the present invention in which a "push method" of capacitor insertion is used, at a different point in the commutation cycle to FIG. 2a.

FIG. 3b is a circuit diagram showing an embodiment of the present invention in which the "pull method" of capacitor insertion is used, at a different point in the commutation cycle to FIG. 3a.

DETAILED DESCRIPTION

Figure 6A:
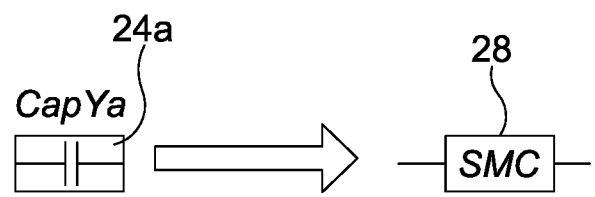
FIGS. 6a and 6b are schematic diagrams showing capacitor modules.
Figure 6B:
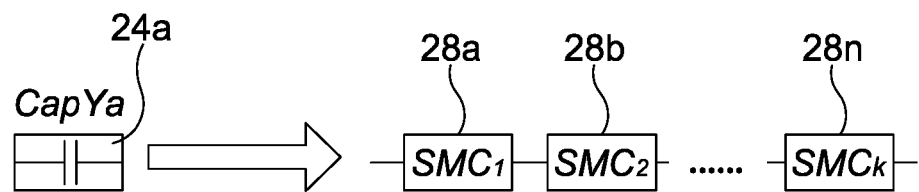
Figure 7A:
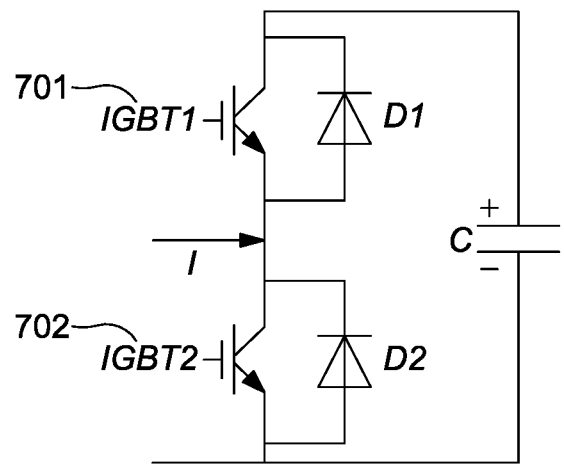
FIG. 7a is a circuit diagram for a half bridge circuit using power electronic switches of IGBTs (or IGCTs, GTOs, MOSFETs, IEGTs, etc) having Gate-Turn-Off capability which may be employed for the SMC module.
Figure 7B:
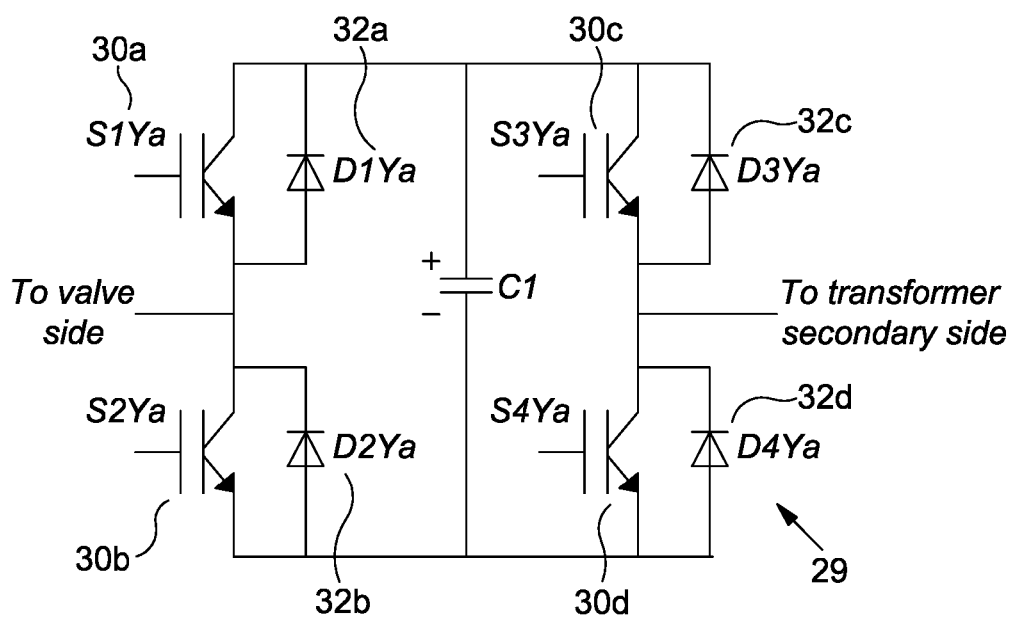
FIG. 7b is a circuit diagram for a full bridge circuit using power electronic switches of IGBTs (or IGCTs, GTOs, MOSFETs, IEGTs, etc) having Gate-Turn-Off capability which may be employed for the SMC module.
Figure 8A:
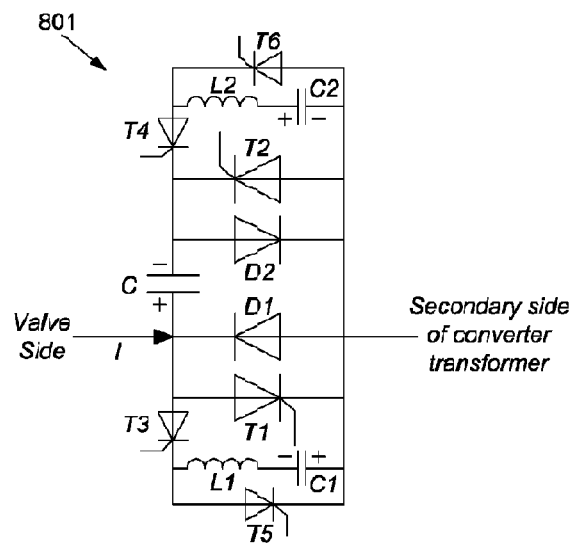
FIG. 8a is circuit diagram for a thyristor based half-bridge capacitor module with diodes, which may be employed for the SMC module.
Figure 8B:
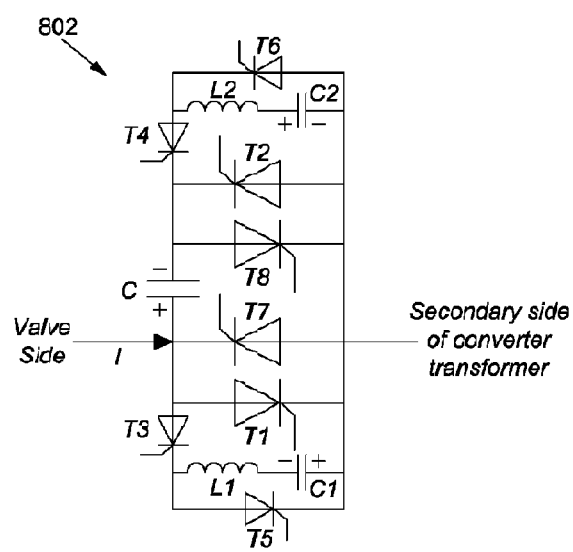
FIG. 8b is circuit diagram for a Thyristor based half-bridge capacitor module without diodes, which may be employed for the SMC module.
Figure 8C:
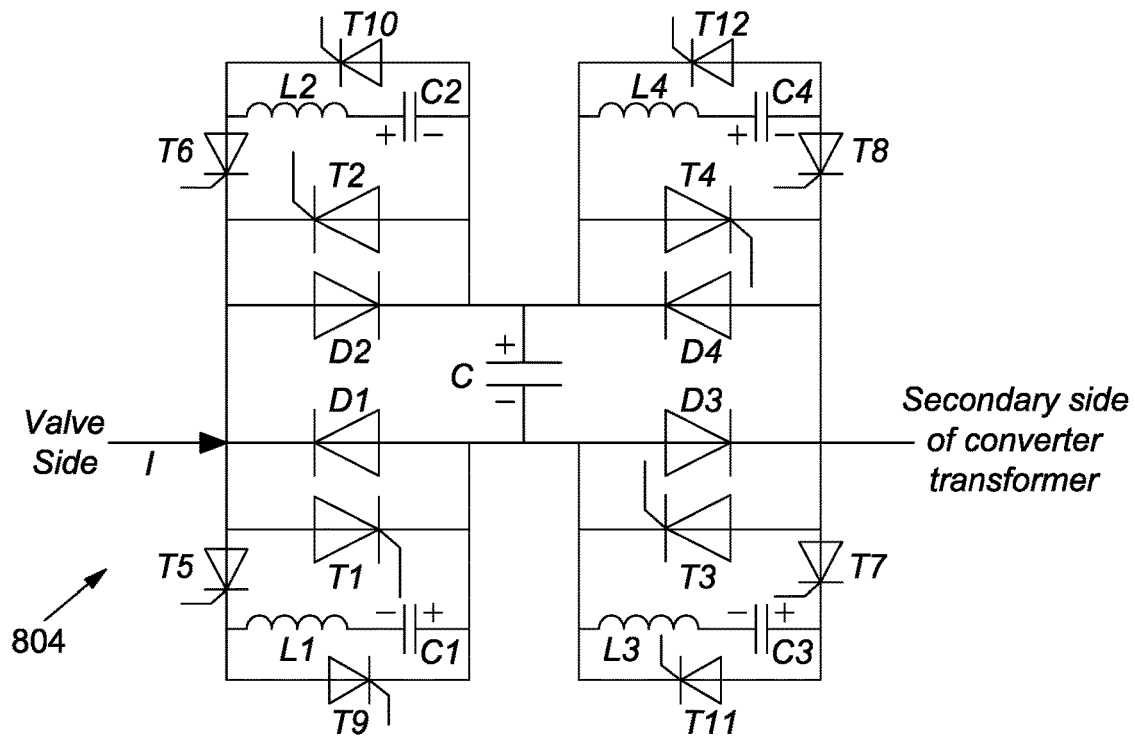
FIG. 8c is circuit diagram for a Thyristor based full-bridge capacitor module with diodes, which may be employed for the SMC module.
Figure 8D:
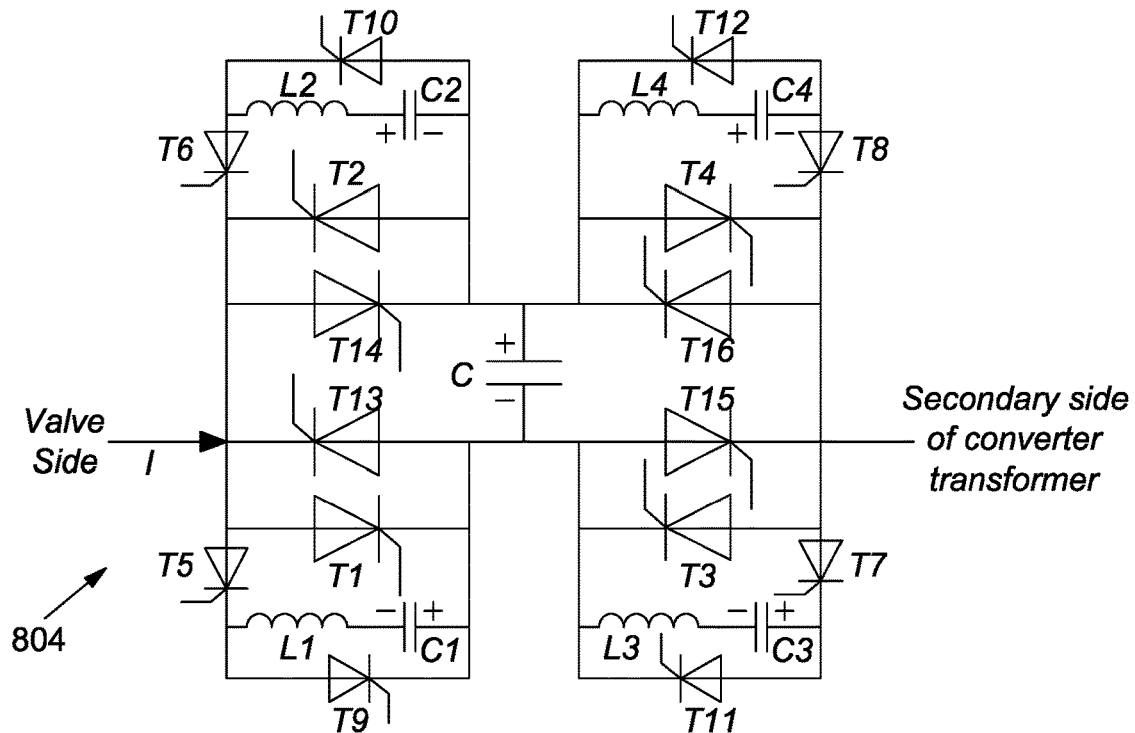
FIG. 8d is circuit diagram for a Thyristor based full-bridge capacitor module without diodes, which may be employed for the SMC module.

For the sake of generalisation, as shown in FIG. 6b, a controllable capacitor branch may consist of number N mixed SMC modules:
  M1 IGBT based half-bridge modules as shown in FIG. 7a
  M2 IGBT based full-bridge modules as shown in FIG. 7b
  N1 Thyristor based half-bridge modules with diodes as shown in FIG. 8a
  L1 Thyristor based half-bridge modules without diodes as shown in FIG. 8b
  N2 Thyristor based full-bridge modules with diodes as shown in FIG. 8c
  L2 Thyristor based full-bridge modules without as shown in FIG. 8d where M1, M2, N1, N2, L1, L2 are non-negative integers (i.e. which may include zero), and the total N=M1+M2+N1+N2+L1+L2>=1. For these mixed modules of a controllable capacitor branch, the SMCs can be applied with either a 'pull', 'push' or Push-Pull' approach as detailed below. Hereinafter, the term "mixed capacitor modules" refers to a number of N mixed SMC modules as detailed above. The term "thyristor capacitor modules" refers to a set of capacitor modules only comprising thyristor-based modules. A capacitor module 24a may comprise an SMC 28, or a number of SMC modules 28a, 28b.

In addition to the above general case, the controllable capacitor branch will include the following special cases where we assume N=M1+M2+N1+N2+L1+L2:
  Option 1: N=M1;
  Option 2: N=M2;
  Option 3: N=L1;
  Option 4: N=L2;
  Option 5: N=N1;
  Option 6: N=N2

For Options 1, 3, and 5, only a 'push' or 'pull' approach can be used because the polarity of the capacitors cannot be reversed, while for Options 2, 4, and 6, any of the 'pull', 'push' or 'Push-Pull' approaches can be used because the polarity of the capacitors can be reversed.

1. 12-Pulse LCC HVDC and Overall Control Strategies Using Fully Controllable Capacitor Modules 1.1 Operation of a Traditional LCC-HVDC without a Controllable Capacitor FIG. 1a shows a 12-pulse LCC HVDC system according to an embodiment of the present invention comprising an inverter 2 with two 6-pulse bridges 8, 10 connected in series. Two 6-pulse bridges 8, 10 are connected to an AC system 3 through wye-wye 25 and delta-wye 27 transformers. A DC current, Idc, flows through lines 4, 6 to/from the 6-pulse bridges 8, 10. It will be appreciated that this invention may be employed with other converter configurations for example in any 6k-pulse bridge arrangement, where k=1, 2, 3, 4 . . . . Each 6-pulse bridge 8, 10 consists of three arms 12, 14, 16, 18, 20, 22 each associated with one phase. Each arm includes an upper thyristor valve/valves 12a, 14a, 16a, 18a, 20a, 22a and a lower thyristor valve/valves 12b, 14b, 16b, 18b, 20b, 22b connected in series.

FIG. 1b shows a representation of a single-direction thyristor valve 1001 comprising anode 1002, cathode 1003, and gate 1004. When the gate 1004 receives a current trigger, current is able to flow from the anode to the cathode (but not in the reverse direction). In embodiments, the thyristor valves 12(a,b), 14(a,b), 16(a,b), 18(a,b), 20(a,b), 22(a,b) of FIG. 1a are single-direction thyristor valves as shown in FIG. 1b.

FIG. 1c shows a representation of a bi-directional thyristor valve 2001 comprising two thyristors 1001a and 1001b placed in an anti-parallel configuration (i.e. a reversed polarity with respect to each other and in a parallel configuration). Each of the two thyristors 1001a and 1001b comprise the features of a single-direction thyristor valve as discussed with respect to FIG. 1b. The bi-directional thyristor valve 2001 is connected to the system via connections 1005 and 1006. In some embodiments, the thyristor valves 12(a,b), 14(a,b), 16(a,b), 18(a,b), 20(a,b), 22(a,b) of FIG. 1a are bi-directional thyristor valves as shown in FIG. 1c. It is possible for current to flow in either direction through bi-directional thyristor valve 2001 and therefore the direction of DC current flow through the bi-directional thyristor valve can be switched by appropriately triggering either of the thyristors 1001(a,b) via the respective gates of the thyristors 1001(a,b). Therefore, use of bi-directional thyristor valves provides for the direction of DC current flow flowing in and out of the LCC system to be changed without requiring switching the polarity of DC power lines that are connected to the LCC system. In other words, it is advantageous to alter the direction of DC current flowing in and out of the LCC system by merely switching operating duty from thyristor 1001a to thyristor 1001b (or vice-versa).

It will be appreciated that the representation of FIG. 1a shows an LCC where DC current flows into the system at DC line 4, and out of the system at DC line 6. Thyristor valves 12(a,b), 14(a,b), 16(a,b), 18(a,b), 20(a,b), 22(a,b) are represented to show that current is enabled to flow in such a direction. However, when bi-directional thyristor valves as shown in FIG. 1c are used, the current flow can be switched so that DC current flows into the system at DC line 6, and out of the system at DC line 4. In this case, thyristor valves 12(a,b), 14(a,b), 16(a,b), 18(a,b), 20(a,b), 22(a,b) would enable current to flow in the opposite direction through upper and lower arms 12, 14, 16, 18, 20, 22 to that indicated by the representation of FIG. 1a.

With continued reference to FIG. 1a, in embodiments, capacitor modules 24(a-c), 26(a-c) may be connected in series in each phase for each 6-pulse bridge. The capacitors can be inserted into or bypassed from the system depending on the operating condition.

In each 6-pulse bridge 8, 10, each parallel arm 12, 14, 16, 18, 20, 22 includes a branch connection 23a-23c, 25a-25c to a respective one of the three phases of the AC system 3. Each branch connection 23a-23c, 25a-25c connects to a parallel arm 12, 14, 16, 18, 20, 22 at a point between the upper thyristor valve/valves 12a, 14a, 16a and lower thyristor valve/valves 12b, 14b, 16b of the parallel arm.

For the upper 6-pulse bridge 8, the branch connections 23a-23c connect to the AC system 3 via a wye-wye (star-star) transformer 25, while for the lower 6-pulse bridge 10, the branch connections 25a-25c connect to the AC system 3 via a delta-wye (delta-star) transformer 27.

In the present invention, each branch connection 23a-23c, 25a-25c includes a capacitor module 24a-24c, 26a-26c, which can insert a capacitor into the branch connection 23a-23c, 25a-25c. This is described in more detail below with reference to FIGS. 3 and 4. Herein references to a valve side of a module will be used to mean the side connected to the bridges 8, 10, while references to a secondary side will be used to refer to the side of a module connected to one of the transformers 25, 27 (this being the secondary side of the transformers, whose primary side is connected to the AC source of AC system 3 as shown in FIG. 1a).

The ideal operation of the inverter 2 is briefly described in the following paragraphs, with respect to the upper 6-pulse bridge 8. It will be appreciated that the lower 6-pulse bridge 10 operates in the same manner as the upper 6-pulse bridge 8. The effect of the capacitor modules 24a-24c, 26a-26c is not considered at this point.

In an ideal inverter, when commutation is not taking place, a first of the upper thyristors 12a, 14a, 16a conducts the DC current. At the same time, a first of the lower thyristors 12b, 14b, 16b, of a different parallel arm 12, 14, 16 to the conducting upper thyristor, also conducts the DC current. This means that the current flowing through two of the three phases is equal to DC current.

A short time later, a commutation period begins, where commutation is provided from an initially conducting thyristor in an initially conducting arm to a subsequently conducting thyristor in a subsequently conducting arm. This means that at the start of the commutation period, the next upper or lower thyristor is fired (receives a current trigger at its gate terminal) and begins to conduct. At this point, there is a voltage difference between the two commutating phases, which is known as the natural commutation voltage. In order for commutation to occur, the effective commutation voltage must be positive, such that the voltage of the subsequently conducting phase is greater than the voltage of the initially conducting phase for the lower thyristors, and the voltage of the subsequently conducting phase is smaller than the voltage of the initially conducting phase for the upper thyristors. This means that the current in the next upper or lower thyristor begins to increase, and the current in the corresponding (upper or lower) first thyristor begins to decrease. This continues until the current in the first thyristor falls below the thyristor's holding current, and the commutation period ends. For the system without capacitors, commutation is driven by the natural commutation voltage only.

The commutation period represents the short overlap period during which current passes through both the first and second thyristors. This is described in more detail below with reference to FIGS. 2a to 2c. The commutation period ends when the first thyristor switches off, and current passes through one of the upper thyristors 12a, 14a, 16a and one of the lower thyristors 12b, 14b, 16b only. The overlap angle, μ, is equal to the phase angle through which current passes through both the first and second thyristors.

The conventional system may be controlled by controlling a firing angle, α, which is the phase angle between the point in the cycle at which the natural commutation voltage becomes positive, and the point at which the thyristor is fired. Firing angle is controlled by controlling the timing of the firing of the thyristors.

It is common to refer to an extinction angle, γ, which is the phase angle between the end of the commutation period, and the point in the cycle at which the natural commutation voltage becomes negative. The extinction angle may also be defined by the relationship given below.

$$\gamma=180°-\mu-\alpha$$

where γ is the extinction angle, μ is the overlapping angle and α is the firing angle.

The above switching procedure continues and the thyristor valves are switched in a repeating sequence such that three-phase AC is produced in the AC system 3.

1.2 Operation of a LCC-HVDC with Fully Controllable Thyristor-Based Capacitor Modules In the following discussion capacitors are used to modify (e.g. increase) the natural commutation voltage at various parts of the commutation cycle. It may be assumed that the effective commutation voltage is equal to a natural commutation voltage plus the voltages of the inserted capacitors. Therefore, hereinafter where it is necessary to refer to the effective commutation voltage in terms of what it would be without such a modification (without use of the capacitors), such as in relation to the definition of firing angle or extinction angle, then this will be referred to as the natural commutation voltage.

The operation of the inverter 2 may be interrupted by an AC fault. In an AC fault, the natural commutation voltage is reduced and this means that a commutation may not be completed, and results in commutation failure of the system. As a result of commutation failure, the system often needs to be restarted. The present invention uses capacitor modules 24, 26 to eliminate this commutation failure.

In embodiments, the capacitor modules 24, 26 may be fully controllable thyristor-based capacitor modules. The fully controllable thyristor-based capacitor modules are advantageously controlled by firing thyristors and therefore the favourable properties associated with Thyristors as discussed above are utilised. Hereinafter, the term "capacitor module" refers to capacitor modules that may be fully controllable thyristor-based capacitor modules.

In all of the cases described below with respect to FIGS. 2a to 4, the insertion of capacitors acts, along with the voltage difference between the two commutating phases, to effect the commutation, by increasing the effective commutation voltage. As well as minimising the effect of an AC fault, the insertion of capacitors reduces the time taken for the completion of a commutation period. While none of the figures illustrate an AC fault, it will be appreciated that the methods of capacitor insertion eliminate commutation failure during a fault event.

Figure 2A:
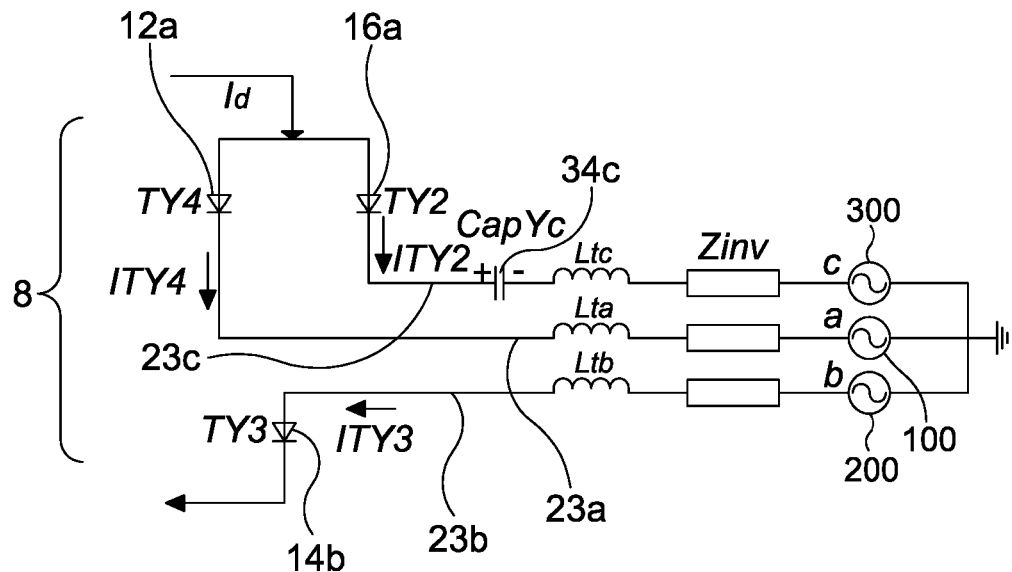
FIG. 2a is a circuit diagram showing an embodiment of the present invention in which a "push method" of capacitor insertion is used.

Referring to FIG. 2a, there is shown an embodiment of the present invention in which the "push method" of capacitor insertion is used. In this embodiment, at the instant that TY4 12a is switched on via its gate terminal, a capacitor, CapYc 34c, is inserted into the phase c branch 23c, such that its positive plate is connected to TY2 16a. CapYc 34c causes the current through TY2 16a to decrease, and "pushes" the current to TY4. CapYc 34c charges during this commutation period. This continues until the current through TY2 16a reaches a value less than the thyristor holding current, and TY2 16a switches off.

Figure 2B:
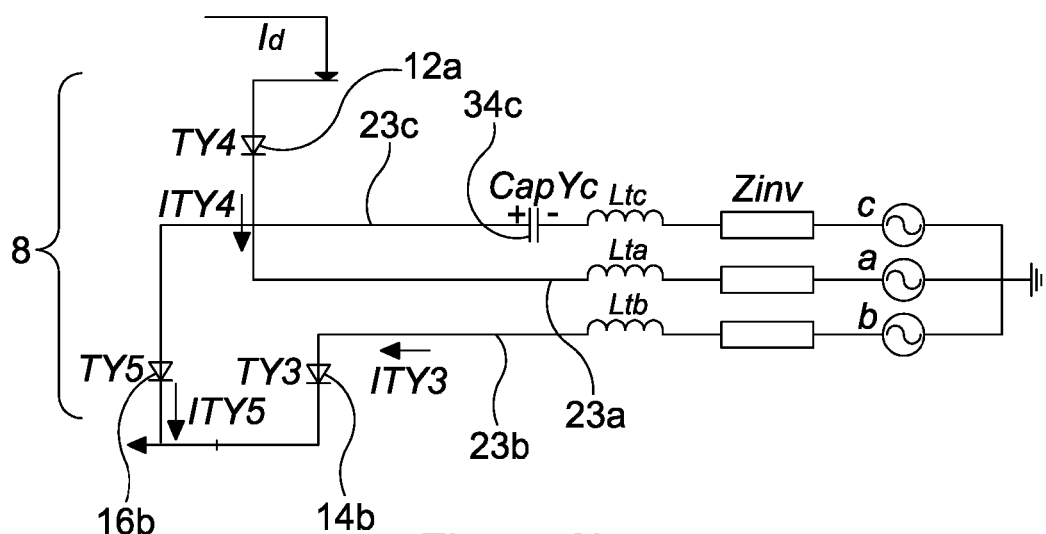

Referring to FIG. 2b, there is shown an embodiment of the present invention in which a "push method" of capacitor insertion is used, at a different point in the commutation cycle to FIG. 2a. In FIG. 2b, TY3 14b is conducting and TY5 16b has just been fired. At this time, the charged CapYc 34c is again inserted into the phase c branch 23c in the same orientation as in FIG. 2a. CapYc 34c causes the current through TY5 16b to increase, and hence causes a reduction in the current through TY3 14b. This continues until the current through TY3 14b reaches a value less than the thyristor holding current, and TY3 14b switches off. CapYc 34c discharges during this commutation period.

The "push method" is carried out at two other points in time in the commutation cycle (not shown), by inserting the capacitor CapYa into the phase a branch 23a to decrease the current through thyristor TY4 12a or to increase the current through thyristor TY1 12b. The method is also carried out at two other points in time in the commutation cycle (not shown) by inserting CapYb into the phase b branch 23b, to decrease the current through thyristor TY6 14a and to increase the current through thyristor TY3 14b.

Over all of the commutation periods, each of the capacitors experiences current in both directions. This means that the capacitors charge and discharge to a similar degree, and the capacitor voltage is approximately balanced, when implementing the "push method".

Figure 3A:
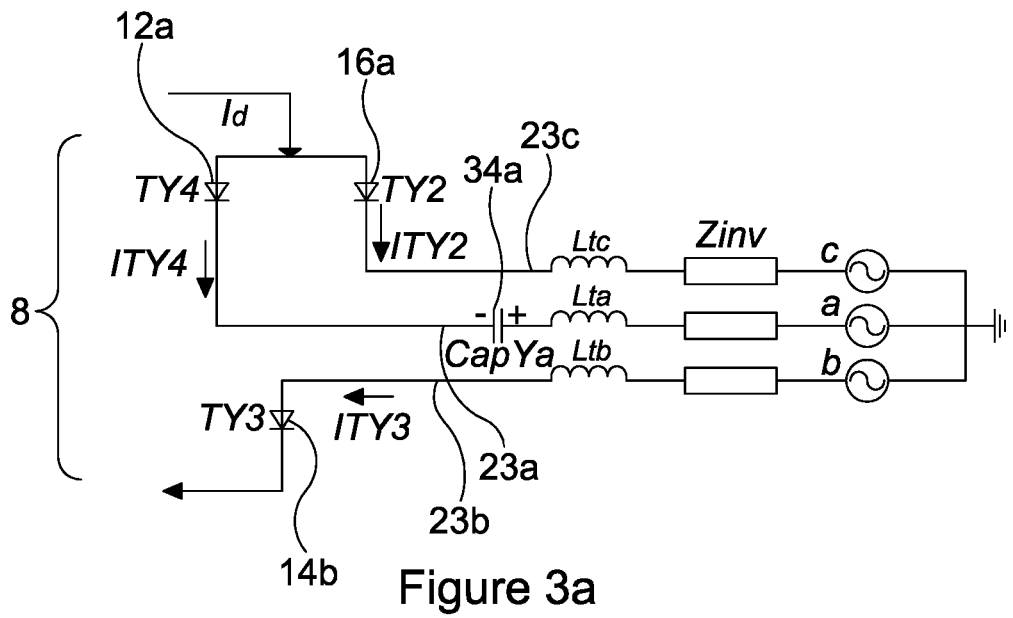
FIG. 3a is a circuit diagram showing an embodiment of the present invention in which a "pull method" of capacitor insertion is used.

Referring to FIG. 3a, there is shown an embodiment of the present invention in which a "pull method" of capacitor insertion is used. In this embodiment, at the instant that TY4 12a is fired, a charged capacitor, CapYa 34a, is inserted into the phase a branch 23a, such that its negative plate is connected to TY4 12a. CapYa 34a "pulls" the current to TY4 12a, increasing the current through TY4 12a, and thereby decreasing the current through TY2. This continues until the current through TY2 16a reaches a value less than the thyristor holding current, and TY2 16a switches off. CapYa 34a discharges during this commutation process, providing current to the AC system 3.

Figure 3B:
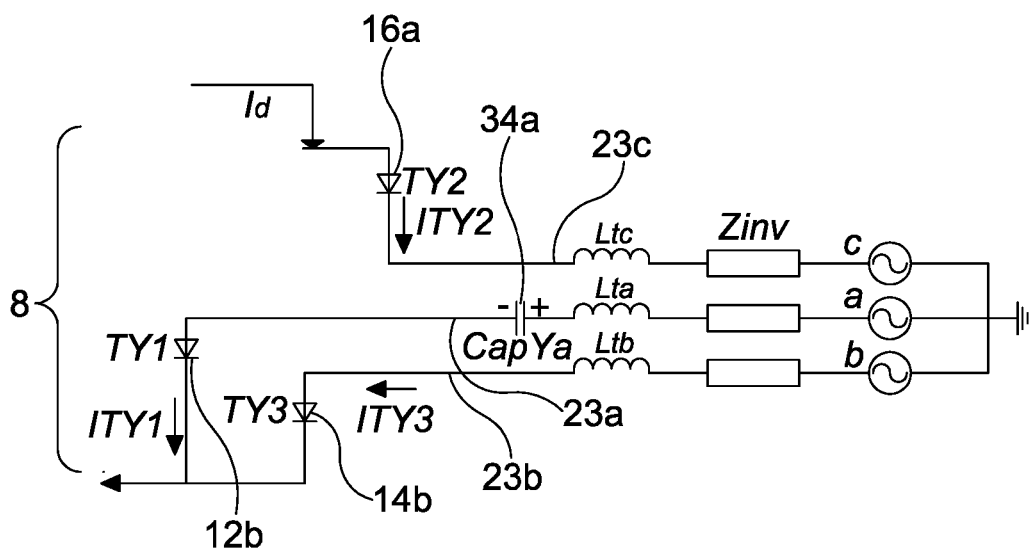

Referring to FIG. 3b, there is shown an embodiment of the present invention in which the "pull method" of capacitor insertion is used, at a different point in the commutation cycle to FIG. 3a. In FIG. 3b, TY1 12b is conducting and TY3 14b is fired. At this time, CapYa 34a is inserted into the phase a branch 23a in the same orientation as in FIG. 2b. CapYa 34a causes the current through TY1 12b to decrease. This continues until the current through TY1 12b reaches a value less than the thyristor holding current and TY1 12b switches off. CapYa 34a charges during this commutation period.

The "pull method" is carried out at two other points in time in the commutation cycle (not shown) by inserting capacitor CapYb into the phase b branch 23b, to increase the current through thyristor TY6 14a or to decrease the current through thyristor TY3 14b. The method is also carried out at two other points in time in the commutation cycle by inserting CapYc 34c into the phase c branch 23c, to increase the current through thyristor TY2 16a or to decrease the current through thyristor TY5 16b.

Over all of the commutation periods, each of the capacitors experiences current in both directions. This means that the capacitors charge and discharge to a similar degree, and the capacitor voltage is approximately balanced, when implementing the "pull method".

Figure 4:
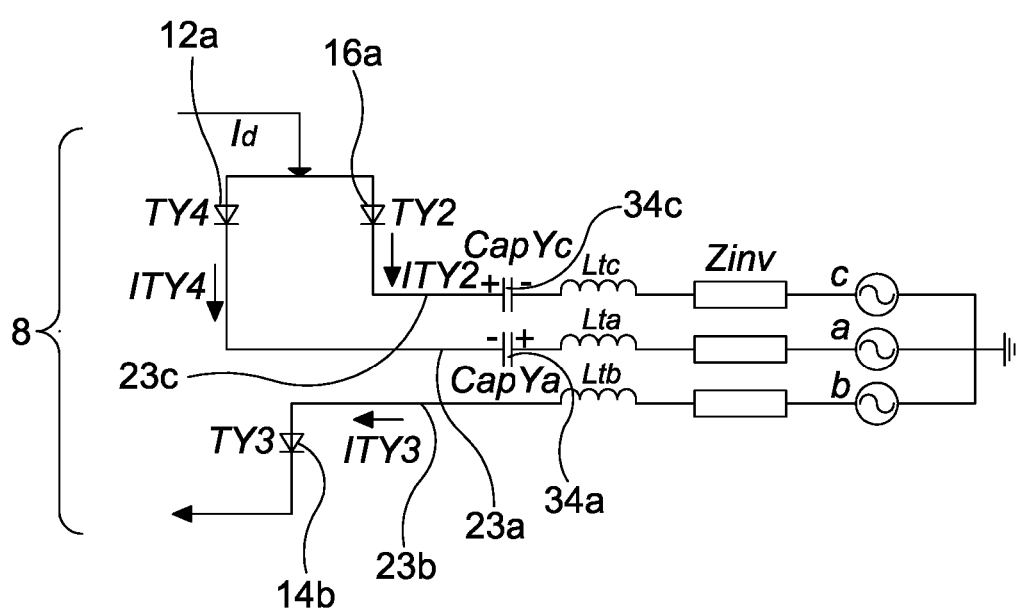
FIG. 4 is a circuit diagram showing an embodiment of the present invention in which a "push & pull method" of capacitor insertion is used.

Referring to FIG. 4, there is shown an embodiment of the present invention in which a "push & pull method" is used. In this embodiment, at the instant that TY4 12a is fired, CapYc 34c, is inserted into the phase c branch 23c, such that its positive plate is connected to TY2 16a. At the same time, CapYa 34b is inserted into the phase a branch 23a, such that its negative plate is connected to TY4 12a. This insertion increases the effective commutation voltage between phase c and phase a by the sum of the two capacitor voltages. This helps to significantly reduce the current through TY2 16a, until the current reaches a value less than the thyristor holding current, and TY2 16a switches off. During this process, CapYc 34c charges and CapYa 34a discharges.

In the "push & pull method", at other points in the cycle, CapYa 34a, CapYb and CapYc 34c are inserted into the branches as is described above for both the "push method" and the "pull method".

An advantage of the "push & pull method" is that over all of the commutation periods, each of the capacitors experiences current in both directions when inserted adjacent to one of the upper thyristors 12a, 14a, 16a. In addition to this, each of the capacitors experiences current in both directions when inserted adjacent to one of the lower thyristors 12b, 14b, 16b. As the DC current is approximately constant, the capacitors charge and discharge to the same degree over the cycle. This means that, for the "push & pull method", the system is balanced.

While the "push method" and "pull method" described above provide useful illustrations of the operation of the system, it will be appreciated that there is a large degree of similarity between the two methods. In both cases, capacitor modules insert a capacitor into the circuit during a commutation period. In addition to this, the two methods are similar as is described below.

In the "push method" with respect to the upper thyristors (as shown in FIG. 2a) and the "pull method" with respect to the lower thyristors (as shown in FIG. 3b), the capacitor modules insert capacitors in an initially conducting arm to increase an effective commutation voltage. This reduces the current flowing through the initially conducting thyristor, and charges the capacitor.

In the "push method" with respect to the lower thyristors (as shown in FIG. 2b) and the "pull method" with respect to the upper thyristors (as shown in FIG. 3a), the capacitor modules insert capacitors in a subsequently conducting arm to increase the effective commutation voltage. This increases the current flowing through the subsequently conducting thyristor, and the capacitor discharges.

Figure 5:
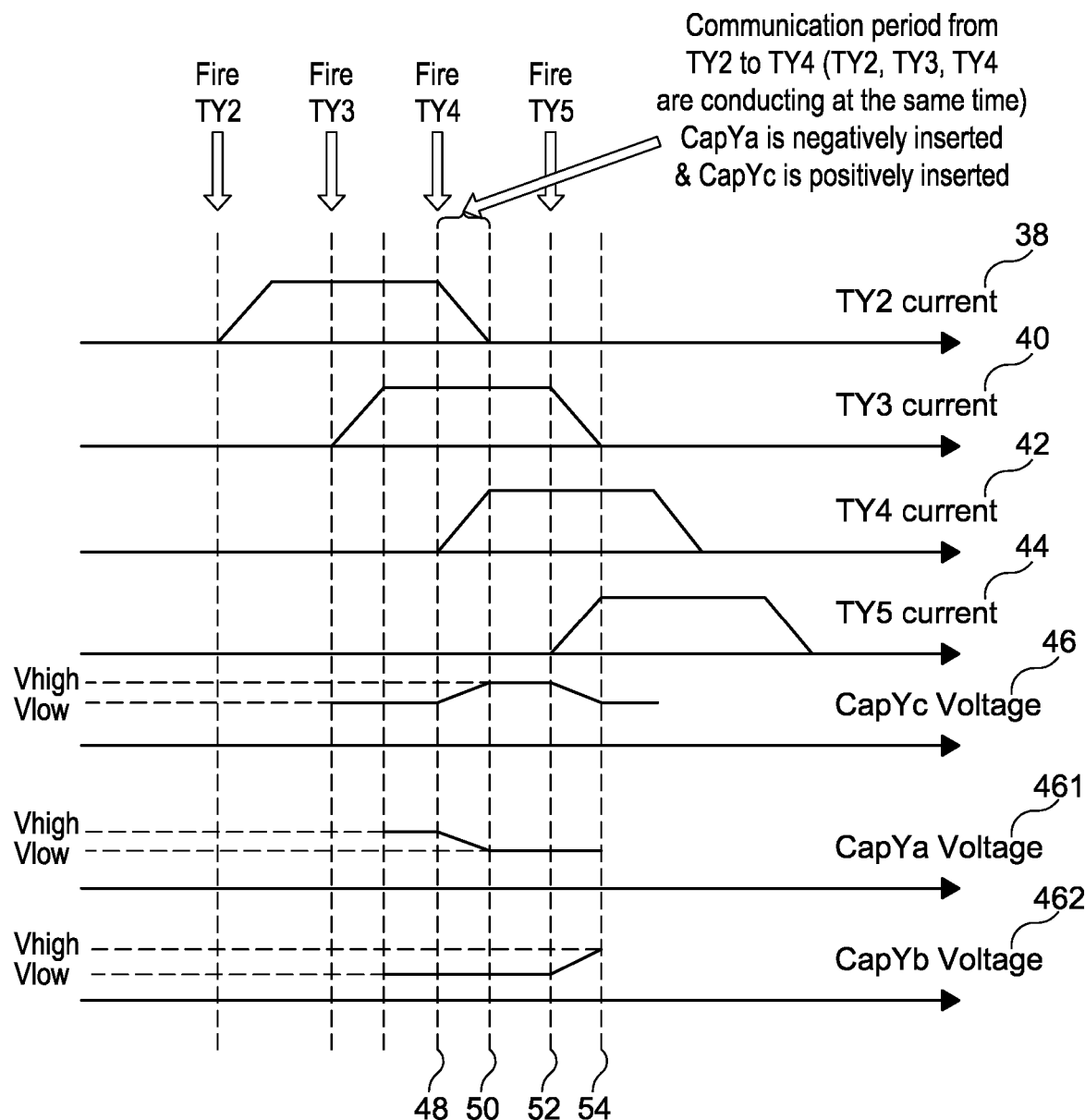
FIG. 5 shows plots of thyristor current and capacitor voltage against time.

Referring to FIG. 5, there are shown plots 36 of thyristor current against time for TY2 38, TY3 40, TY4 42 and TY5 44, as well as a plot of CapYc, Ya, Yb voltage against time 46, 461, 462. These plots represent the "push & pull method", as described above with reference to FIG. 2a and FIG. 4.

At first time 48, the commutation period from thyristors TY2 to TY4 begins. This is as described above with reference to FIGS. 2a, 3a and 4. At second time 50, the commutation period from thyristors TY2 to TY4 ends. In between first time 48 and second time 50, CapYc is inserted into the phase c branch, such that its positive terminal is connected to TY2 (in order to "push" the current to TY4). CapYc is charged and its voltage increases from V_low to V_high. The current in TY2 decreases from the DC value to zero, while the current in TY4 increases from zero to the DC value.

In between first time 48 and second time 50 CapYa is inserted into the phase a branch, such that its negative terminal is connected to TY4. CapYa is discharged and its voltage reduces from V_high to V_low. The effective commutation voltage between phase c and phase a is the natural commutation voltage plus the sum of the two capacitor voltages of CapYa and CapYc.

At third time 52, the commutation period from TY3 to TY5 begins, while at fourth time 54, the commutation period from TY3 to TY5 ends. In between the third time 52 and the fourth time 54, CapYc is inserted into the phase c branch, in the same orientation as described in the previous paragraph. However, at this point, the current in the phase c branch is in the opposite direction, and CapYc discharges. This causes the voltage across CapYc to return from V_high to V_low.

In between third time 52 and the fourth time 54, CapYb is inserted into the phase b branch such that its negative terminal is connected to TY3 (in order to decrease the current through TY3). CapYb is charged and its voltage increases from V_low to V-high. The effective commutation voltage between phase b and phase c is the natural commutation voltage plus the sum of the two capacitor voltages of CapYb and CapYc.

In between third time 52 and the fourth time 54, the current in TY3 decreases from the DC value to zero, while the current in TY5 increases from zero to the DC value.

In conventional LCC systems (without the capacitor insertion described above) the extinction angle, which is related to the turn-off time of the thyristors (and is defined above), cannot be too small, to ensure that a commutation margin is preserved for possible disturbances on the AC side. Extinction angle is primarily set by controlling the firing angle, which, in turn, is controlled by controlling the timing of the firing of the thyristors. In addition to this, extinction angle is affected by the overlap angle, as defined above.

With the method described here, commutation failure is eliminated and extinction angle can take a larger range of values. This means that firing angle can be controlled over a larger range of values, allowing the exchange of reactive power with the AC system to be favourably controlled. This leads to significant size reductions in reactive power support devices, smaller converter transformer rating, lower converter losses and a lower number of thyristor levels. Additionally, firing angle may be controlled such that the extinction angle for the converter when operated as an inverter (when DC power is converted to AC) is negative, thereby supplying reactive power to the AC system. Again, firing angle is controlled by controlling the timing of the firing of the thyristors. This ability to control the firing angle and/or extinction angle means that if there is a fault of the AC system, the inverter can be controlled to supply reactive power to the AC system. This leads to a reduction in the required reactive power support, thereby allowing reduced sizes of AC filters, a smaller converter transformer rating, and lower converter losses.

In addition to the above, a smaller extinction angle means that for a given DC voltage level, AC voltage can be lower, and the thyristor valves 12, 14, 16, 18, 20, 22 can be rated for a lower voltage.

In summary, the exchange of reactive power with the AC system or the AC voltage at a high voltage busbar 101 (referenced to FIG. 1a) of the HVDC transformer can be controlled by controlling the firing angle of the inverter 2, which is referred to as Reactive Power/Voltage Control Scheme 1.

In addition to Scheme 1, embodiments may comprise the following reactive power/voltage control schemes:

Scheme 2: Change capacitor voltage levels of the thyristor capacitor modules or the mixed capacitor modules (24, 26). The reactive power generated by the thyristor capacitor modules or the mixed capacitor modules (24, 26) will increase with the increase of capacitor voltage levels of the thyristor capacitor modules or the mixed capacitor modules, vice versa.

Scheme 3: Inserting a variable number of the thyristor capacitor modules or the mixed capacitor modules (24, 26) and hence change the total capacitor voltage level of the thyristor capacitor modules or the mixed capacitor modules. The reactive power generated by the thyristor capacitor modules or the mixed capacitor modules (24, 26) will increase with the increase of the number of the thyristor capacitor modules or the mixed capacitor modules (24, 26), vice versa.

Scheme 4: Reactive Power/Voltage Control Scheme 4 comprises combining any of schemes 1 to 3 together.

Referring to FIGS. 6a and 6b, there are shown schematic diagrams which show that capacitor module 24a may be a single modular capacitor (SMC) 28 or a series of connected SMCs 28a, 28b, . . . , 28n forming a Multiple Modular Capacitor (MMC). This is also true for the other capacitor modules 24b, 24c, 26a, 26b, 26c (see FIG. 1a).

2. Operating Principles of Full-Bridge IGBT Controlled Capacitor Modules 2.1 Half-Bridge IGBT Controlled Capacitor Modules Referring to FIG. 7a, there is shown a circuit diagram for an SMC module, which allows a main capacitor C to be inserted in one polarity into the corresponding phase. Hereinafter, the term "main capacitor" refers to a capacitor of an SMC module that is inserted into a phase of the inverter in order to effect the "push", "pull" and "push and pull" methods detailed above. In FIG. 7a, the SMC 28 which makes up the capacitor module is a half-bridge circuit. The half bridge circuit includes two IGBTs 701, 702, each equipped with an integral inverse parallel diode D1, D2. It will be appreciated that similar SMC modules may be used for capacitor modules 24b, 24c, 26a-26c, in other branch connections 23b, 23c, 25a-25c.

By switching IGBT1 on and IGBT2 off, the capacitor C is switched into the circuit, while switching IGBT1 off and IGBT2 on results in the capacitor C being bypassed. Therefore, the half-bridge IGBT controlled capacitor module cannot change the polarity of the capacitor C.

2.2 Full-Bridge IGBT Controlled Capacitor Modules

Referring to FIG. 7b, there is shown a circuit diagram for an SMC module 28, which allows the capacitor 34 to be inserted in either polarity into the branch connection 23a. In the present embodiment, the SMC 28 which makes up the capacitor module 24a is a full bridge circuit 29. The full bridge circuit 29 includes four insulated gate bipolar transistors (IGBTs) 30a, 30b, 30c, 30d, each equipped with an integral inverse parallel diode 32a, 32b, 32c, 32d. It will be appreciated that similar SMC modules may be used for capacitor modules 24b, 24c, 26a-26c, in branch connections 23b, 23c, 25a-25c.

Switching IGBTs 30b, 30c on and IGBTs 30a, 30d off results in the capacitor 34a being switched into the circuit in one orientation, while switching IGBTs 30a, 30d on and IGBTs 30b, 30c off results in capacitor 34a being switched into the circuit in the opposite orientation. Switching IGBTs 30a, 30c on and 30b, 30d off, or switching IGBTs 30b, 30d on and 30a, 30c off results in the capacitor 34a being bypassed.

An advantage of using the full bridge circuit 29 is that the circuit is simple, and requires a small number of semiconductor components. In comparison, the half bridge IGBT controlled Capacitor Circuit shown in FIG. 7a cannot change the polarity of the capacitor, and hence a higher level of voltage insertion from the capacitor module/capacitor modules 24a in each phase is required. This means a larger number of semiconductor components may be needed.

3. Operating Principles of Thyristor Based Capacitor Modules

Referring to FIGS. 8a-d, in embodiments, the "push method", "pull method" and "push & pull method" can be actioned by thyristor based capacitor modules 801, 802, 803, 804. The advantages associated with thyristors discussed above are therefore realised. However, as the switching off of thyristors is very different from that of the IGBTs, the detailed switching sequences of different configurations of thyristor based capacitor modules 801, 802, 803, 804 (i.e., thyristor based half-bridge capacitor module with diodes 801, thyristor based half-bridge capacitor module without diodes 802, thyristor based full-bridge capacitor module with diodes 803, thyristor based full-bridge capacitor module without diodes 804) are described below. A thyristor based capacitor module in one phase is used in the below examples, and it is appreciated that the thyristor based capacitor modules in other phases have the same, or corresponding switching sequences.

In embodiments, the thyristor based capacitor modules may be half-bridge or full-bridge circuits where the voltage of a main capacitor C is inserted into the circuit. The arms of the bridge circuits are formed by one-directional electronic components. In the examples described, diodes or thyristors are used for this purpose. There may be two arms in each half-bridge circuit and four arms in each full-bridge module. The arms of the circuits are in parallel with components including thyristors T1, T2, T3, T4, and subsidiary capacitors C1, C2 and inductors L1, L2. As detailed below, these components allow arms of the bridge circuits to be bypassed merely by firing thyristors. This has the effect of inserting the main capacitor either in or out of the flow of current through the capacitor module. In the full-bridge thyristor based capacitor modules, the main capacitor C may be inserted in either polarity.

3.1 Switching Sequence of Thyristor Based Half-Bridge Capacitor Module with Diodes (FIG. 8a)

The left-hand side of the module in FIG. 8a is connected to the valve side and the right-hand side of the module is connected to the secondary side of converter transformer 25 (as per FIG. 1a). In all figures, the labelling of the terminals of capacitors C, C1, C2, C3, C4 as positive (+) or negative (−) refers to the state of the capacitors when they are described as being "positively" charged in the description. Hereinafter when a capacitor is described as being "negatively charged" then the electrical state of the capacitor is reversed relative to what is shown in the Figures. The terms "auxiliary" or "subsidiary" capacitors refer to capacitors within a capacitor module other than the main capacitor. The auxiliary/subsidiary capacitors are used in the circuitry that causes the main capacitor C to be switched in and out of the series with branch connections 23a-c, 25a-c (with reference to FIG. 1a). In embodiments shown in the Figures, there is only one main capacitor C in each capacitor module. The half-bridge capacitor modules shown in FIGS. 8a and 8b have two auxiliary capacitors C1, C2. The full-bridge capacitor modules shown in FIGS. 8c, 8d have 4 auxiliary capacitors C1, C2, C3, C4.

Initial Charging of C, C1 and C2:

Before the start of commutations, all the capacitors within the module 801 will be positively charged for successful operation (i.e as per states indicated by polarity symbols in FIG. 8a). Firstly, the main capacitor C will be externally charged using current I. Then thyristor T3 and thyristor T2 are fired to charge up the capacitor C1 with a negative polarity. The firing of thyristor T2 negatively charges C1 since there is a connection to the negative terminal of the positively charged main capacitor C. Thyristor T5 is fired next to reverse C1 voltage polarity so that it is positively charged. It is necessary to initially negatively charge C1 in order to ensure that it can be subsequently positive charged due the circuit formed when thyristor T5 is fired. To charge subsidiary capacitor C2, thyristors T4 and T1 are fired so subsidiary capacitor C2 is also negatively charged. Similarly, thyristor T6 is fired next so that subsidiary capacitor C2 becomes positively charged. After all capacitors in the module 801 are charged, the state of the capacitors is as shown in FIG. 8a.

Action 1: Inserting the Main Capacitor into the Main Circuit Loop at the Instant of Commutation Start:

Now consider the behaviour of the capacitor module 801 shown in FIG. 8a throughout one cycle for one 6-pulse group. The module connected in Phase C 300 (FIGS. 1-4) is used as an example to describe the switching sequence of half-bridge thyristor based capacitor modules (in this example commutation from TY3 to TY5 as per FIG. 1a). Shortly before or at the start of commutation from TY3 14b to TY5 16b, thyristor T2 is fired. This has the effect of inserting the main Capacitor C into series with the branch 23c (FIGS. 1-4). When the commutation is started, the current flows through T2 and to the main capacitor C from the AC side, discharging the capacitor. At the same time, the main capacitor C provides additional commutation voltage which equals to the voltage that was across its terminals after it had been charged.

Action 2: Bypassing the Main Capacitor from the Main Circuit Loop at the End of Commutation:

At the end of this commutation, i.e. when the current through TY3 14b drops to zero, the main capacitor C must be removed from being in series with branch 23c (FIGS. 1-4). Thyristor T2 is currently allowing current to flow to the main capacitor C and must therefore be switched off. Thyristor T4 is fired to turn off thyristor T2 in the following way: Once thyristor T4 is fired, subsidiary capacitor C2, inductor L2, thyristor T4 and thyristor T2 form an L-C oscillation circuit, and the oscillation lasts for half the oscillation period until the thyristor T4 current drops to zero. At the end of oscillation, subsidiary capacitor C2 becomes negatively charged with thyristors T2 and T4 being turned-off. All the current in phase C now goes through diode D1 and the main capacitor C is effectively bypassed.

Action 3: Reversing C2 Polarity:

After thyristor T2 is turned off, thyristor T6 is fired. It forms another LC oscillation circuit comprising thyristor T6, subsidiary capacitor C2 and inductor L2 which results in the subsidiary capacitor C2 voltage becoming positive again at the end of the oscillation. It is therefore primed to turn off T2 in the next commutation cycle. No firing signals are provided to the thyristors in this module until the start of commutation from TY6 to TY2.

Action 4: Firing T1 Forming a Current Path:

Once TY2 is fired, thyristor T1 is fired so that the current is flowing through thyristor T1 to the AC side, bypassing the main capacitor. The current is now flowing in the opposite direction across the capacitor module compared to as described in actions 1, 2, and 3 above.

Action 5: Turning Off T1 and Inserting the Main Capacitor into the Main Circuit Loop with a Short Lead Time Just Before the Start of Commutation:

Before the commutation from TY2 to TY4 is started, the main capacitor C must be inserted. Thyristor T3 is fired to turn off thyristor T1. Once thyristor T3 is fired, an LC oscillation turns off thyristor T1, resulting in a negative voltage polarity of subsidiary capacitor C1. This is the same process as occurs when thyristor T4 is fired to turn off thyristor T2 as discussed above. After the oscillation, the main capacitor C is inserted into the circuit with current flowing through the main capacitor and diode D2 to the AC side, charging the main capacitor C.

Action 6: Reversing C1 Polarity:

Thyristor T5 is fired to reverse the subsidiary capacitor C1 voltage to be positively charged so that it can be used to turn off thyristor T1 in the next commutation cycle.

3.2 Switching Sequence of Thyristor Based Half-Bridge Capacitor Module without Diodes (FIG. 8b)

The capacitor module in FIG. 8b is the same as the module in FIG. 8a, except that the diodes of D1 and D2 are replaced with thyristors T7 and T8. The same switching sequence for thyristors T1-T6 of the module in FIG. 8a is adopted for the module in FIG. 8b. The only difference is that both thyristors T7 and T8 in the module in FIG. 8b are fired throughout each cycle at points where it is necessary for current to flow through them. For example, during action 5 when the main capacitor C is to be inserted as discussed above.

3.3 Switching Sequence of Thyristor Based Full-Bridge Capacitor Module with Diodes (FIG. 8c)

Similar to the half-bridge capacitor modules shown in FIGS. 8a and 8b, the left-hand side of the module in FIG. 8c is connected to the valve side and the right-hand side of the module is connected to the secondary side of converter transformer 25 (as per FIG. 1a).

Initial Charging C, C1-C4:

Before the start of commutations, all the capacitors within the module 803 will be charged positively for successful operation (i.e as per the states indicated by polarity symbols in FIG. 8c). As for the half-bridge capacitor modules, the skilled person would appreciate that subsidiary capacitors C1-C4 must be initially negatively charged in order for them to be subsequently positively charged. Firstly, the main capacitor C will be externally charged using current I. Then thyristor T2 and thyristor T5 are fired to charge subsidiary capacitor C1 with a negative polarity. The firing of thyristor T2 negatively charges C1 since there is a connection to the negative terminal of the positively charged main capacitor C. Thyristor T9 is fired next to reverse C1 voltage polarity so that it is positively charged. To charge subsidiary capacitor C2, thyristors T1 and T6 are fired so that subsidiary capacitor C2 is negatively charged. T10 is fired next so that subsidiary capacitor C2 becomes positively charged. To charge subsidiary capacitor C3, thyristors T4 and T7 are fired so subsidiary capacitor C3 is negatively charged. Thyristor T11 is fired next so that subsidiary capacitor C3 becomes positively charged. To charge subsidiary capacitor C4, thyristors T3 and T8 are fired so subsidiary capacitor C4 is negatively charged. Thyristor T12 is fired next so that subsidiary capacitor C2 becomes positively charged.

Action 1:

Now consider the behaviour of the capacitor module shown 803 in FIG. 8c throughout one cycle for one 6-pulse group. The module connected in Phase C 300 (FIGS. 1-4) is used as an example to describe the switching sequence of full-bridge thyristor based capacitor modules (in this example, commutation from TY3 to TY5 as per FIG. 1a). In order to help commutation to take place from TY3 to TY5, main capacitor C is inserted in order to provide an additional commutation voltage. At this point, current must be directed to flow to the valve side in order to increase the current flow through TY5 and reduce the current flow through TY3. Shortly before or at the start of commutation from TY3 14b to TY5 16b, thyristors T2 and T3 are fired so that the main capacitor C is inserted into the circuit in the state shown in FIG. 8c. Note that before T2 and T3 are fired, the capacitor C is positively charged due to the initial charging process described above. There is minimal current flow through the capacitor module 800 before the commutation process begins. Capacitor C as positively charged cannot provide a voltage towards either side of the capacitor module unless either T2 is fired or T4 and is fired. This is due to the orientation of diodes D1, D2, D3, and D4. In this case, T2 and T3 are fired in order that the charged capacitor C provides a current flow to the DC side. In other words, the capacitor voltage of main capacitor C provides additional commutation voltage for the commutation process. The current is now flowing through thyristor T3, the main capacitor C and thyristor T2 to the DC side, discharging the main capacitor C.

Action 2:

At the end of this commutation when current through TY3 14b drops to zero, thyristor T6 is fired to turn off thyristor T2. The electronic process behind this is equivalent to that detailed above with respect to firing thyristor T4 to turn of thyristor T2 in the half-bridge thyristor. As a result of firing thyristor T6, to turn off thyristor T2, subsidiary capacitor C2 is left negatively charged. Once thyristor T2 is turned off, the current is flowing through thyristor T3 and diode D1 to the valve side, bypassing the main capacitor C.

Action 3:

T10 is then fired shortly afterwards to reverse the C2 voltage polarity so that it returns to being positive and it is therefore primed to turn off thyristor T2 in the next commutation cycle.

Action 4:

Actions 1-3 described the commutation from TY3 14b to TY5 16b where the purpose of the capacitor module 803 (shown as 24c in FIG. 1a) is to provide an additional voltage to TY5 16b in order to aid with the commutation process. During the commutation from TY5 14b to TY1 12b it may be desired for capacitor module 803 to restrict current in order to help the commutation process. At the start of commutation from TY5 to TY1, T7 is fired to turn off T3, so that the main capacitor is inserted into the circuit with its negative polarity connected to the valve side. Therefore main capacitor voltage again helps the commutation process. The current is now flowing through diode D4, main capacitor C and D1 to the valve side, charging the main capacitor C.

Action 5:

Thyristor T11 is then fired to reverse the subsidiary capacitor C3 voltage polarity so that it returns to being positive.

Action 6:

For the commutation from TY6 14a to TY2 16a it may be desirable for capacitor module 803 (shown as 24c in FIG. 1a) to "pull" additional current through TY2 16a where current is flowing from the valve side to the secondary side of the converter transformer. At the start of commutation from TY6 14a to TY2 16a, thyristors T1 and T4 are fired to insert the main capacitor C into the circuit, with its negative side connecting to the valve side. The current flows through thyristor T1, main capacitor C and thyristor T4 to the AC side, discharging the main capacitor C. The voltage of main capacitor C is helping this flow of current. When this commutation completes, i.e. the TY6 current drops to zero, thyristor T8 is fired to turn off thyristor T4. Once thyristor T4 is turned off, the current flows through thyristor T1 and diode D3 to the AC side, bypassing the main capacitor.

Action 7:

T12 is then fired to reverse the C4 voltage polarity so that it returns to being positive.

Action 8:

For the commutation from TY2 16a and TY4 12a it may be desirable for capacitor module 803 (shown as 24c in FIG. 1a) to reduce current through TY2 16a where current is flowing from the valve side to the secondary side of the converter transformer. Shortly before the start of commutation from TY2 16a to TY4 12a, thyristor T5 is fired to turn off thyristor T1. Once thyristor T1 is turned off, the main capacitor C is inserted into the circuit with its positive side connected to the valve side, helping the commutation process. The current is now flowing through diode D2, main capacitor C and D3 to the AC side, charging the main capacitor C.

Action 9:

T9 is then fired to reverse the voltage polarity of C1 so that it returns to being positive.

3.4 Switching Sequence of Thyristor Based Full-Bridge Capacitor Module without Diodes (FIG. 8d)

The full-bridge capacitor module in FIG. 8d is the same as the module in FIG. 8c, except that the diodes of D1-D4 are replaced with thyristors T13-T16. The same switching sequence for T1-T12 of the module in FIG. 8c is adopted for the module in FIG. 8d. The only difference is that the thyristors T13-T16 in the module in FIG. 8d are fired throughout each cycle at points where it is necessary for current to flow through them.

As discussed above, replacing of Diodes in FIG. 8b and FIG. 8d by Thyristors can increase the current handling rating of the thyristor based capacitor modules as normally Thyristors have much higher ratings than those of Diodes. In comparison to the IGBT based (controlled) Capacitor modules as shown in FIG. 7a and FIG. 7b, the Thyristor based (Controlled) Capacitor modules shown in FIGS. 8a, 8b, 8c, and 8d have much higher current ratings so that they can be used for very high HVDC power rating of more than 2 GW and up to 12 GW, at ±1100 kV DC voltage.

In summary, the fully controllable thyristor based capacitor module will have the following features:
(a) Higher current rating: A fully controllable thyristor based capacitor module has higher current rating than that of a fully controllable IGBT based capacitor module;
(b) Higher voltage rating: A fully controllable thyristor based capacitor module has much higher voltage rating than that of a fully controllable IGBT based capacitor module;
(c) Lower power losses: The power loss of a fully controllable thyristor based capacitor module is much less than that of a fully controllable IGBT based capacitor module;
(d) Higher overloading capability: A fully controllable thyristor based capacitor module has much higher overloading capability than that of a fully controllable IGBT based capacitor module;
(e) Less modules needed: Due to (b), less modules will be needed for a fully controllable thyristor based capacitor module in comparison to a fully controllable IGBT based capacitor module.

The fully Controllable Thyristor based Capacitor Modules have the following distinguished features:
(a) Capacitor or capacitors can be switched off from the circuit being inserted at any instant if needed;
(b) charging/discharging to the capacitors can be fully controlled by the Thyristor Switches;
(c) the voltage level of the capacitors can be fully controlled by the Thyristor Switches;
(d) the polarity of capacitors can be reversed for full bridge Controllable Thyristor based Capacitor Modules;
(e) the current rating of the module is as high as that of the Thyristor Switches.

The mixed thyristor/IGBT based modules have the features of both the fully controllable thyristor based capacitor module and the fully controllable IGBT based capacitor module. The mixed module/modules will provide flexibility by combining a fully controllable thyristor based capacitor module with a higher voltage rating and fully controllable IGBT based capacitor module with lower voltage rating. Hence the combination of these modules will provide efficiency in terms of voltage and reactive power control.

It will be appreciated that there may be further alternative capacitor modules which may be used to insert capacitors into the circuit.

The above description uses a converter operated as an inverter shown in FIG. 1a as an example to explain the proposed control approach. However, the description and control principles are applicable to a converter operated as a rectifier. For the case of a rectifier, the timing of the firing of the thyristor valves can be controlled such that a varying firing angle for the rectifier can be achieved, thereby supplying a controllable reactive power to the AC system as specified and even the firing angle for the rectifier can be negative, thereby supplying a positive reactive power to the AC system (i.e. the thyristor is fired before the natural commutation voltage becomes positive).

Physically, the state of the inverter with a negative extinction angle is similar to that of the rectifier with a negative firing angle.

Figure 9A:
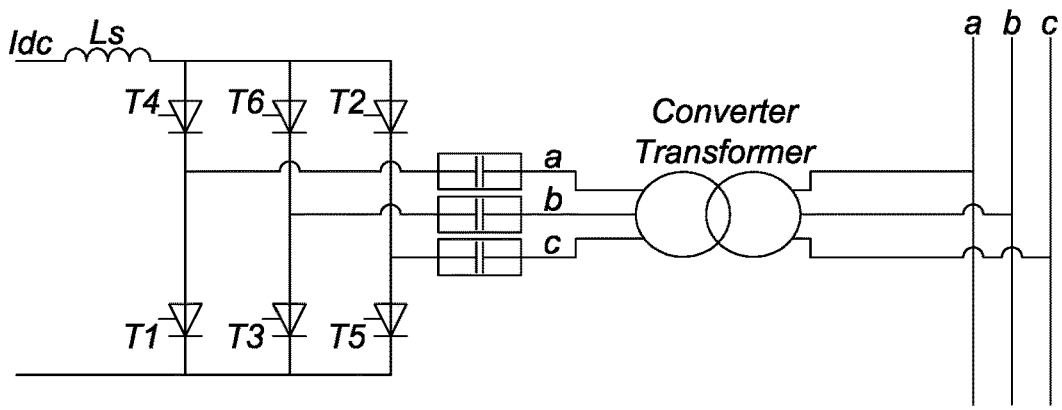
FIGS. 9a-f show circuit diagrams of a portion of different three-phase LCC inverter (or rectifier) topologies.
Figure 9B:
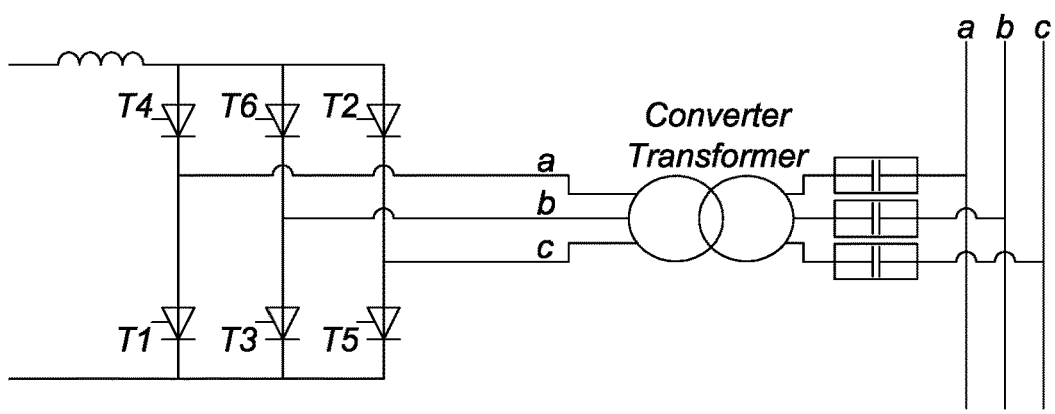
Figure 9C:
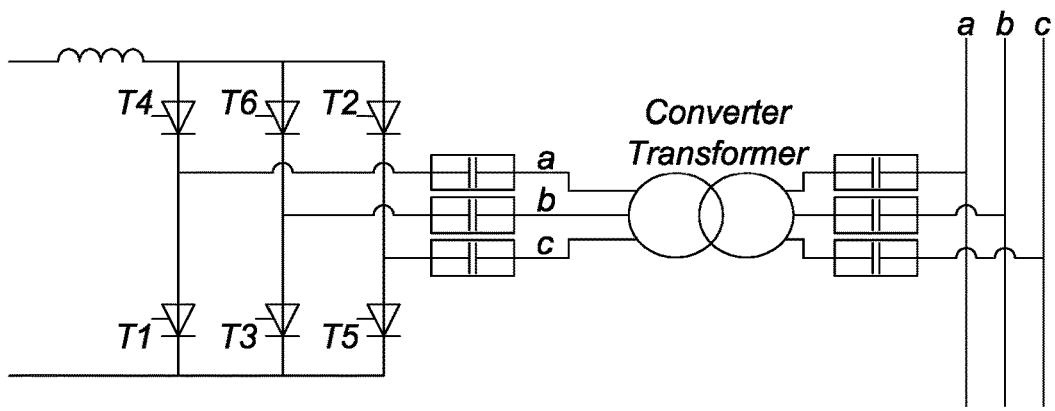
Figure 9D:
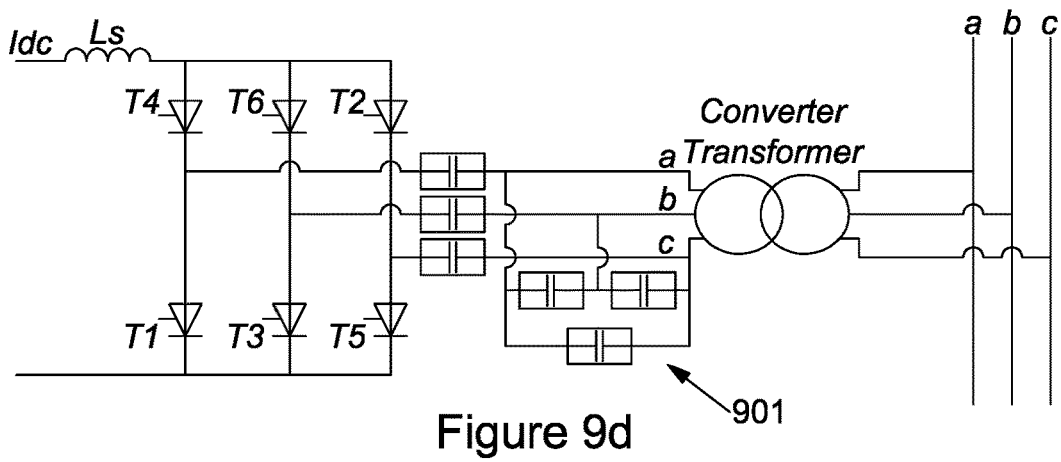
Figure 9E:
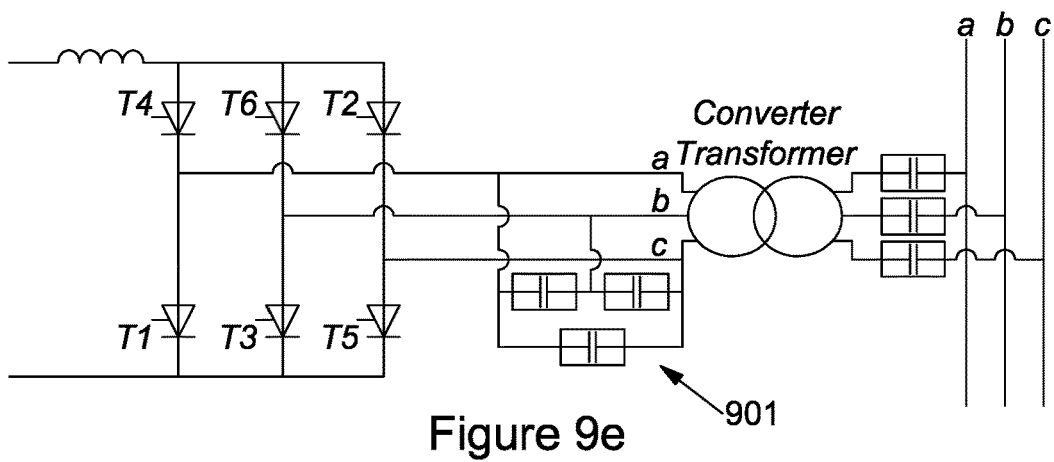
Figure 9F:
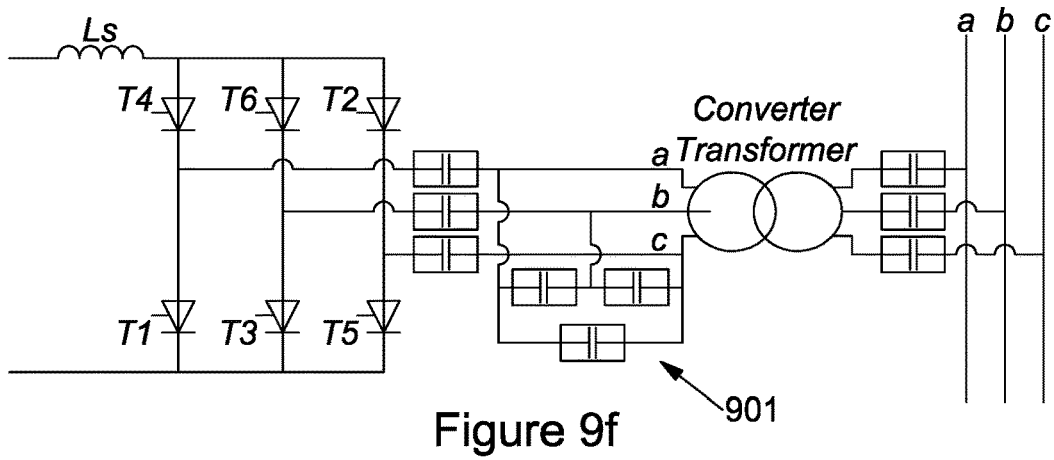
Figure 10:
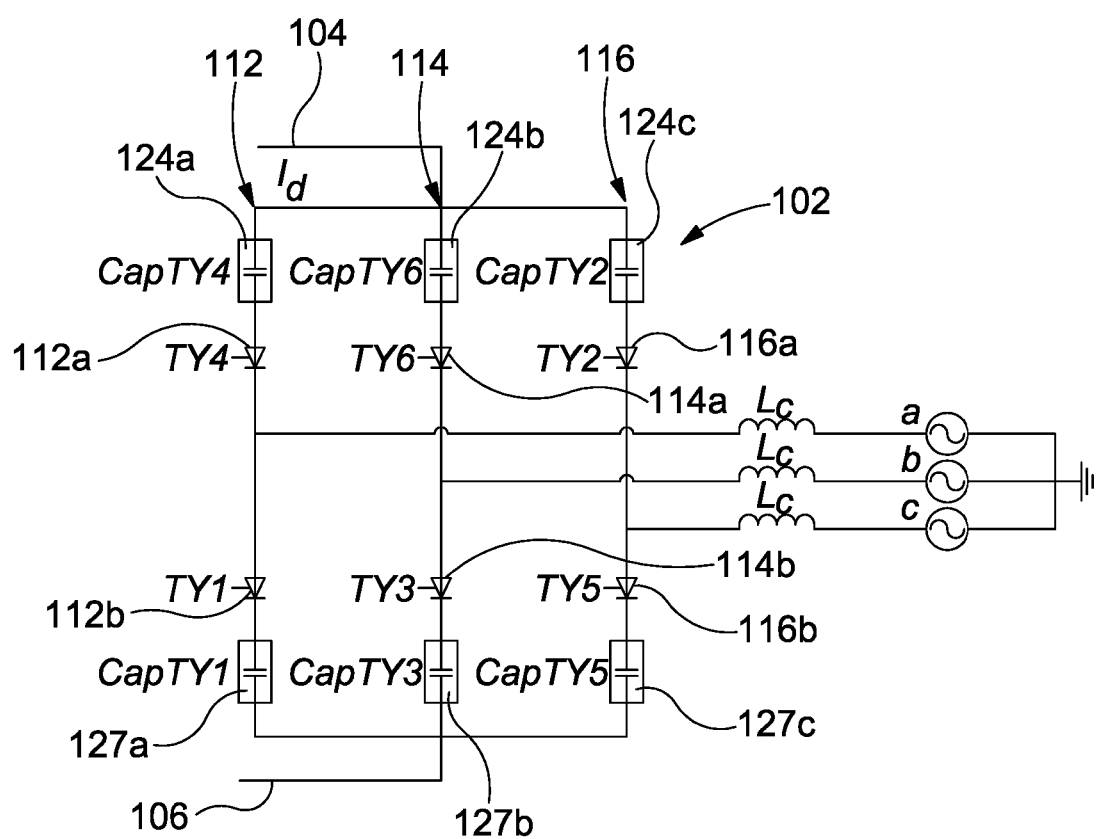
FIG. 10 is a circuit diagram of alternative positions of fully controlled capacitor modules.

The controllable Thyristor based capacitor modules or the mixed Controllable Thyristor based/IGBT based capacitor modules could be installed:
(a) either between DC terminals and the DC converter transformer as shown in FIG. 9a
(b) or between the system sides of the converter transformer and system side AC busbars as shown in FIG. 9b;
(c) or combination of (a) and (b) as shown in FIG. 9c;
(d) or (a) plus shunt connections 901 of the SMC modules between different phases as shown in FIG. 9d;
(e) or (b) plus shunt connections 901 of the SMC modules between different phases as shown in FIG. 9e
(f) or (a) and (b) plus shunt connections 901 of the SMC modules between different phases as shown in FIG. 9f;
(g) or into each of the three parallel arms 112, 114, 116 as shown in FIG. 10.

It will be appreciated that there are further alternative embodiments of the invention, in which the capacitor modules are connected in different locations. For example, in FIG. 10, the locations of the capacitor modules and thyristors may be swapped.

LCC inverter 102 functions in the same manner as that described above with respect to FIG. 1a, and results in the same circuits as those shown above with respect to FIGS. 2a to 4, during commutation. In order to ensure that the charging and discharging of the capacitors is balanced for LCC inverter 102, it is preferred that this arrangement is used to implement the "push & pull method", as described above.

In the above topologies, the shunt modules are purely for the control of the exchange of reactive power with the AC power grid and AC voltages for the inverter or the rectifier.

The present disclosure also relates to the following:
According to embodiments of the present invention, there is provided a line commutated converter, LCC, for a high-voltage, direct current, HVDC, power converter. The LCC comprises at least one bridge circuit for connection to at least one terminal of a DC system. Each bridge circuit comprises a plurality of arms, and each arm is associated with a respective phase of an AC system. Each arm comprises an upper and lower thyristor connected in series, an associated branch extending from between the upper and lower thyristors, and at least one capacitor module for each phase. The, or each capacitor module is operable to insert a capacitor into the respective arm of the bridge circuit using a fully Controllable Thyristor based Capacitor Module or fully Controllable Thyristor based Capacitor Modules; or mixed controllable capacitor modules by series connecting fully Controllable Thyristor based Capacitor Modules and fully controllable capacitor modules based on circuit topologies of IGBTs (or IGCTs, GTOs, MOSFETs, IEGTs, etc) having Gate-Turn-Off capability.

It is an advantage that this invention leads to complete elimination of commutation failure under various AC side faults (single-line-to-ground, line-to-line, double-line-to-ground, three-phase-to-ground, etc). In addition, the invention leads to control the exchange of reactive power with the AC power grid or AC busbar voltage of the HVDC converter.

In an embodiment, in a "push method", the capacitor modules/module connected to the incoming phase will be inserted into the circuit for the commutation between lower thyristor valves where capacitors are discharged, and the capacitor modules/module connected to the outgoing phase will be inserted into the circuit for the commutation between upper thyristor valves, where capacitors are charged.

For "push method", the capacitor modules are inserted into the outgoing phase for commutations between upper thyristor valves shortly before the start of commutation for the balancing of capacitor voltages.

In an embodiment, in a "pull method", the capacitor modules/module connected to the outgoing phase will be inserted into the circuit for the commutation between lower thyristor valves where capacitors are charged, and the capacitor modules/module connected to the incoming phase will be inserted into the circuit for the commutation between upper thyristor valves where capacitors are discharged.

For "pull" method, the capacitor modules are inserted into the outgoing phase for commutations between lower thyristor valves shortly before the start of commutation for the balancing of capacitor voltages.

An advantage associated with both the "push method" and the "pull method" is that the capacitor can charge and discharge during the commutation cycle. This means that the capacitor voltage is approximately balanced.

In an embodiment, in a "push & pull method", the capacitors connected to both the incoming and outgoing valves will be inserted into the circuit in opposite polarity for all commutations. The capacitor inserted into the outgoing phase is charged, and the capacitor inserted into the incoming phase is discharged.

For push and pull method, the capacitor modules are inserted into the outgoing phase shortly before the start of commutations for the balancing of capacitor voltages.

An advantage of the "push & pull method" is that the insertion voltage of each phase can be around half that of each inserted capacitor in either the "push method" or the "pull method", while achieving similar commutation performance. This means that the "push & pull method" is more cost-effective than that of the "push method" or "pull method".

A further advantage of the push & pull method is that the same capacitor is inserted into an initially conducting arm and a subsequently conducting arm, for both an upper and a lower thyristor. This means that the capacitor charges and discharges to a similar degree over the commutation cycle, and the capacitor voltage is balanced.

Complete commutation failure can be eliminated by using the above described "push method", "pull method" and "push & pull method".

A further advantage of the present invention is that independent fast reactive power control and tracking at the inverter side can be carried out by controlling the firing angle and/or inserted capacitor voltage (or voltages). Both positive and negative reactive power exchange with the AC network at inverter side can be implemented with the fast reactive power control and the proposed converter topology. This means that extinction angle can even be negative, which will export positive reactive power to the AC network. When extinction angle is positive, the inverter absorbs reactive power from the AC network. When extinction angle decreases, the reactive power, which the inverter absorbs from the AC network, decreases. This leads to cost savings, as there is a reduction in the required reactive power support at inverter side. Smaller converter transformer rating, lower converter losses and a lower number of thyristor levels in each valve can be achieved.

In embodiments, each capacitor module is operable to insert a capacitor into a branch of the bridge circuit.

In embodiments, each capacitor module is operable to insert a capacitor into an arm of the bridge circuit, above or below the associated branch.

Capacitor modules can be connected in series to form a multiple modular capacitor (MMC).

In embodiments, the, or each half bridge circuit is configured to insert a capacitor in one polarity into an arm.

In embodiments, the, or each full bridge circuit is configured to insert a capacitor in either polarity into an arm.

An advantage of using the full bridge circuit is that the circuit is simple, and requires a small number of semiconductor components.

In embodiments, at least one of the capacitor modules is a mixed commutation circuit.

In embodiments, the or each mixed commutation circuit is configured to selectively insert a first capacitor in a first polarity, the first capacitor and a second capacitor both in the first polarity, or the first capacitor in a second polarity.

An advantage of the mixed commutation circuit is that it has some of the functionality of two full-bridge circuits connected together, but has a smaller number of switching devices.

In embodiments, the method further includes controlling timing of the firing of the thyristor valves of a converter operated as an inverter such that a varying extinction angle for the inverter can be achieved, thereby supplying a controllable reactive power to the AC system, and even an extinction angle for the inverter can be negative.

In an embodiment, the method further comprises controlling timing of the firing of the thyristor valves of a converter operated as a rectifier such that a varying firing angle for the rectifier can be achieved, thereby supplying a controllable reactive power to the AC system and even the firing angle for the rectifier can be negative, thereby supplying a positive reactive power to the AC system.

Physically, the state of the inverter with a negative extinction angle is similar to that of the rectifier with a negative firing angle.

The present disclosure also relates to the following numbered clauses:

Clause 1. The invention is that at least one fully Controllable Thyristor based Capacitor Module for each phase, the or each fully controllable thyristor based capacitor module is operable to insert a capacitor into the respective arm of the bridge circuit of the LCC HVDC.

The fully Controllable Thyristor based Capacitor Modules have the distinguished features: (1) Capacitor or capacitors can be switched off from the circuit being inserted at any instant if needed; (2) charging/discharging to the capacitors can be fully controlled by the Thyristor Switches; (3) the voltage level of the capacitors can be fully controlled by the Thyristor Switches; (4) the polarity of capacitors can be reversed for full bridge Controllable Thyristor based Capacitor Modules at any instant if needed; (5) the current rating of the module is as high as that of the Thyristor Switches.

Clause 2. The fully Controllable Thyristor based Capacitor Module can be in half bridge configuration, where the polarity of capacitor insertion cannot be reversed.

Clause 3. The fully Controllable Thyristor based Capacitor Module can be in full bridge configuration, where the polarity of capacitor insertion can be reversed.

Clause 4. The invention is that alternative to the above fully Controllable Thyristor based Capacitor Module (with either half bridge configuration or full bridge configuration), at least one mixed thyristor/IGBT based module for each phase, the or each mixed thyristor/IGBT based capacitor module is operable to insert a capacitor into the respective arm of the bridge circuit of the a typical line commutated converter, LCC.

Clause 5. If the capacitor modules are all half bridge thyristor based capacitor modules with the capacitor voltage charged to the first polarity, the capacitor modules/module connected to the incoming phase will be inserted when the commutation is between the lower thyristor valves; and the capacitor modules/module connected to the outgoing phase will be inserted when the commutation is between the upper thyristor valves.

Clause 6. If the capacitor modules are all half bridge thyristor based capacitor modules with the capacitor voltage charged to the first polarity, the capacitor modules/module will be inserted into the outgoing phase shortly before the start of commutation between upper thyristor valves for the balancing of capacitor voltage.

Clause 7. If the capacitor modules are all half bridge thyristor based capacitor modules with the capacitor voltage charged to the second polarity, the capacitor modules/module connected to the outgoing phase will be inserted when the commutation is between the lower thyristor valves; and the capacitor modules/module connected to the incoming phase will be inserted when the commutation is between the upper thyristor valves.

Clause 8. If the capacitor modules are all half bridge thyristor based capacitor modules with the capacitor voltage charged to the second polarity, the capacitor modules/module will be inserted into the outgoing phase shortly before the start of commutation between lower thyristor valves for the balancing of capacitor voltages.

Clause 9. If the capacitor modules are all full bridge thyristor based capacitor modules, the capacitor modules/module connected to the incoming and outgoing phases will be inserted at the same time with opposite insertion orientation during all commutations. The inserted capacitor voltages provide extra commutation voltage, and guarantee the success of commutations.

Clause 10. If the capacitor modules are all full bridge thyristor based capacitor modules, the capacitor modules/module connected to the outgoing phase will be inserted shortly before the start of commutation for the balancing of capacitor voltages.

Clause 11. If the capacitor modules are a series connection of mixed half bridge thyristor based capacitor modules and full bridge thyristor based capacitor modules, the full bridge thyristor based capacitor modules will operate according to clause 9-clause 10, while the half bridge thyristor based capacitor modules will operate according to clause 5-clause 8 depending on the voltage polarity of capacitors.

Clause 12. If the capacitor modules are a series connection of at least one fully Controllable Thyristor based Capacitor Modules and at least one fully controllable capacitor modules based on circuit topologies of IGBTs (or IGCTs, GTOs, MOSFETs, IEGTs, etc) having Gate-Turn-Off capability, the full bridge thyristor based capacitor modules will operate according to clause 9 and clause 10, while the half bridge thyristor based capacitor modules will operate according to clause 5-clause 8 depending on the voltage polarity of capacitors.

Clause 13. The LCC of any of the previous clauses, wherein each thyristor based capacitor module is operable to insert a capacitor into a branch of the bridge circuit.

Clause 14. The method of any of previous clauses further comprising controlling a firing angle, wherein the firing angle is controlled by controlling timing of the firing of the thyristors, thereby controlling an exchange of reactive power with the AC system.

Clause 15. Method 1: The method of clause 14, further comprising controlling timing of the firing of the thyristor valves such that a varying extinction angle for the inverter can be achieved, thereby supplying a controllable reactive power to the AC system, and even an extinction angle for the inverter can be negative thereby supplying a positive reactive power to the AC system.

Clause 16. Method 2: Reactive Power/Voltage Control Method 2 for control of the exchange of reactive power with the AC system or the AC voltage at the high voltage busbar of the HVDC transformer can be implemented by changing capacitor voltage levels of the thyristor capacitor modules or the mixed capacitor modules.

Clause 17. Method 3: Reactive Power/Voltage Control Method 3 is implemented by inserting a variable number of the thyristor capacitor modules or the mixed capacitor modules and hence by changing the total capacitance value of the thyristor capacitor modules or the mixed capacitor modules.

Clause 18. Method 4: Reactive Power/Voltage Control Method 4 is by combining any of the methods described in clause 15-clause 17 above together.

Clause 19. Method 1: The method of clause 14-clause 18, wherein the LCC converter is used as a rectifier for converting from AC to DC, the method further comprising controlling timing of the firing of the thyristors such that a varying firing angle for the rectifier can be achieved, thereby supplying a controllable reactive power to the AC system and even the firing angle for the rectifier can be negative, thereby supplying a positive reactive power to the AC system (denoted as Method 1).

Clause 20. Method 2: Reactive Power/Voltage Control Method 2 for control of the exchange of reactive power with the AC system or the AC voltage at the high voltage busbar of the HVDC transformer can be implemented by changing capacitor voltage levels of the thyristor capacitor modules or the mixed capacitor modules.

Clause 21. Method 3: Reactive Power/Voltage Control Method 3 is implemented by inserting a variable number of the thyristor capacitor modules or the mixed capacitor modules and hence by changing the total capacitor voltage level of the thyristor capacitor modules or the mixed capacitor modules).

Clause 22. Method 4: Reactive Power/Voltage Control Method 4 is by combining any two of the methods described in clause 20-clause 21 together or combining all the three methods described in clause 19-clause 21 together.

Clause 23. The method of any of clauses 4 to 13, wherein during a fault of the AC system, the effective commutation voltage prevents a commutation failure of the HVDC.

Clause 24. The method of any of clauses 14 to 22, wherein the LCC converter is used as a rectifier for converting from AC to DC, and as an inverter for converting from DC to AC, wherein during a fault of the AC system, the capacitor insertions can provide a controllable reactive power support to the AC systems by the rectifier and the inverter, respectively, which can even supply a positive reactive power to the AC system, with a negative firing angle control for the rectifier, and with a negative extinction angle control for the inverter, respectively.

The invention claimed is:

1. A line commutated converter for a high-voltage, direct current power converter, the line commutated converter comprising at least one line commutated converter bridge circuit for connection to at least one terminal of a DC system, each bridge circuit comprising a plurality of arms, each associated with a respective phase of an AC system, each arm comprising:
   at least one upper thyristor valve, and at least one lower thyristor valve connected in series;
   an associated branch extending from between the at least one upper thyristor valve and the at least one lower thyristor valve; and at least one thyristor-based capacitor module for each phase, each module comprising a plurality of module thyristors, each capacitor module operable to insert a main capacitor into a respective arm of the bridge circuit by firing at least one or more of said module thyristors;

wherein each thyristor-based capacitor module further comprises a plurality of subsidiary capacitors and a plurality of inductors; and wherein the subsidiary capacitors and inductors are operable to form a plurality of at least two L-C oscillation circuits within the thyristor-based capacitor module.

2. The line commutated converter of claim 1 wherein a current rating of the at least one thyristor-based capacitor module for each phase is as high as that of the plurality of module thyristors within the at least one thyristor-based capacitor module.

3. The line commutated converter of claim 1 wherein at least one thyristor-based capacitor module is a module bridge circuit being in a half-bridge configuration.

4. The line commutated converter of claim 1 wherein at least one thyristor-based capacitor module is a module bridge circuit being in a full-bridge configuration.

5. The line commutated converter of claim 3 wherein each half-bridge capacitor module further comprises at least one one-directional component, each one-directional component forming an arm of a module half-bridge circuit, an output of the main capacitor being applied to the module half-bridge circuit and to circuitry external to the half-bridge capacitor module.

6. The line commutated converter of claim 4 wherein each full-bridge capacitor module further comprises at least four one-directional components and wherein the one directional components form the arms of a module full-bridge circuit, an output of the main capacitor being applied to the module full-bridge circuit and to circuitry external to the full-bridge capacitor module.

7. The line commutated converter of claim 1 wherein each L-C oscillation circuit comprises a bypass thyristor, a subsidiary capacitor, and an inductor, each bypass thyristor being situated in parallel with an arm of a module bridge circuit, one-directional electronic components being biased opposite the respective bypass thyristor.

8. The line commutated converter of claim 5 wherein the one directional electronic component is a diode.

9. The line commutated converter of claim 5 wherein the one directional electronic component is a thyristor.

10. The line commutated converter of claim 7 wherein each bypass thyristor is operable to allow current to bypass the arm of the bridge circuit that is parallel to said bypass thyristor.

11. The line commutated converter of claim 7 wherein each L-C oscillation circuit is operable to generate a current oscillation that causes the bypass thyristor of the respective L-C oscillation circuit to be switched off.

12. The line commutated converter of claim 11 further comprising a first subsidiary module thyristor associated with each L-C oscillation circuit, said first subsidiary module thyristor being operable to switch off the bypass thyristor of a respective oscillation circuit when fired by causing a current oscillation in the respective L-C oscillation circuit.

13. The line commutated converter of claim 12 further comprising a second subsidiary module thyristor associated with each L-C oscillation circuit, said second subsidiary module thyristor being operable to charge a subsidiary capacitor of a respective oscillation circuit by allowing current to flow to said subsidiary capacitor when fired.

14. The line commutated converter of claim 1 comprising at least one full-bridge configured thyristor-based capacitor module operable to charge the main capacitor to either a positive or negative polarity and thereby insert the main capacitor in either polarity into said respective arm of the bridge circuit.

15. The line commutated converter of claim 14 wherein at least one full-bridge configured thyristor-based capacitor module operable to switch the polarity of the main capacitor by firing one or more thyristors.

16. The line commutated converter of claim 1 wherein multiple thyristor-based capacitor modules are in series connection with one or more arms.

17. The line commutated converter of claim 1 wherein at least one thyristor-based capacitor module is in series connection with at least one IGBT-based capacitor module.

18. The line commutated converter of claim 1 wherein at least one thyristor-based capacitor module is in series connection with at least one capacitor module based on any of Integrated Gate-Commutated Thyristors, Gate Turn-off Thyristors, Metal-Oxide-Semiconductor Field-Effect Transistors, Injection-Enhanced Gate Transistors.

19. The line commutated converter of claim 1 wherein at least one half-bridge configured thyristor-based capacitor module is in series with at least one full-bridge thyristor-based capacitor module.

20. The line commutated converter of claim 1 wherein each upper thyristor valve and each lower thyristor valve is a bi-directional thyristor valve, wherein each bi-directional thyristor valve comprises first and second bi-directional component thyristors arranged in an anti-parallel configuration, and wherein each bi-directional thyristor valve is operable to allow current to flow across the bi-directional thyristor valve in any direction thereby providing for switching a direction of current flowing through the plurality of arms.

21. A method of operating a line commutated converter for a high-voltage, direct current converter, wherein the line commutated converter comprises at least one bridge circuit for connection to at least one terminal of a DC system, each bridge circuit comprising a plurality of arms, each associated with a respective phase of an AC system, each arm comprising:

at least one upper thyristor valve, and at least one lower thyristor valve, connected in series;

an associated branch extending from between the at least one upper thyristor and the at least one lower thyristor; and at least one thyristor-based capacitor module for each phase, the method comprising a step of;

inserting, by firing one or more thyristors within the at least one thyristor-based capacitor modules, a main capacitor into the respective arm of the bridge circuit; and further comprising a step of firing one or more first subsidiary thyristors within the at least one thyristor-based capacitor modules in order to allow current to flow through one or more L-C oscillation circuits thereby generating one or more L-C oscillations, each L-C oscillation causing both a bypass thyristor and a first subsidiary thyristor to switch off.

22. The method of claim 21 wherein the at least one thyristor-based capacitor modules has a full bridge topology and further comprising a step of firing one or more thyristors within the at least one thyristor-based capacitor modules in order to reverse a polarity of the main capacitor.

23. The method of claim 21 further comprising a step of firing one or more first subsidiary thyristors within the at least one thyristor-based capacitor modules in order to switch off a bypass thyristor, thereby diverting current from an arm of a module bridge circuit within said thyristor-based capacitor modules.

24. The method of claim 22 further comprising the step of firing at least one second subsidiary thyristor within the at least one thyristor-based capacitor modules in order to charge at least one subsidiary capacitor.

25. The method of claim 21 further comprising the step of firing one or more thyristors that are one-directional components that form arms of a module bridge circuit within the at least one thyristor-based capacitor modules.

26. The method of claim 21 wherein each upper thyristor valve and each lower thyristor valve is a bi-directional thyristor valve, wherein each bi-directional thyristor valve comprises first and second bi-directional component thyristors arranged in an anti-parallel configuration, and wherein the method further comprises switching a direction of current flowing through the plurality of arms by firing one of the first and second bi-directional component thyristors.

27. A method of switching of a thyristor based half-bridge capacitor module for use in commutation of a line commutated converter wherein the capacitor module comprises a thyristor, a main capacitor, a plurality of auxiliary capacitors and a plurality of diodes, the method comprising:
 (i) inserting the main capacitor into a main circuit loop at an instant of commutation start;
 (ii) bypassing the main capacitor from the main circuit loop at an end of commutation;
 (iii) reversing polarity of a first auxiliary capacitor;
 (iv) firing the thyristor to form a current path;
 (v) turning off the thyristor and inserting the main capacitor into the main circuit loop with a short lead time just before the instant of commutation start; and
 (vi) reversing polarity of a second auxiliary capacitor.

28. The method according to claim 27, modified in that the thyristor based half-bridge capacitor module does not include diodes but does include a plurality of additional thyristors, wherein the additional thyristors are fired at points where it is necessary for current to flow through the additional thyristors, including at step (v) when the main capacitor is inserted into the main circuit loop.

29. A method of switching a thyristor based full-bridge capacitor module for use in commutation of a line commutated converter which comprises a converter transformer, wherein a capacitor module is connected to the line commutated converter between a valve side and a secondary side of the converter transformer and comprises a main capacitor, at least four auxiliary capacitors and a plurality of diodes, the method comprising:
 (i) initial charging of the main and auxiliary capacitors;
 (ii) inserting the main capacitor into a circuit to provide an additional commutation voltage;
 (iii) bypassing the main capacitor;
 (iv) reversing a voltage polarity of a first of the auxiliary capacitors;
 (v) inserting the main capacitor into a circuit with a negative polarity of the main capacitor connected to the valve side;
 (vi) reversing the voltage polarity of a second subsidiary capacitor;
 (vii) inserting the main capacitor into the circuit, with a negative side of the main capacitor connecting to a valve side;
 (viii) reversing a voltage polarity of a third subsidiary capacitor;
 (ix) inserting the main capacitor into a circuit with a positive side of the main capacitor connected to a valve side;
 (x) reversing a voltage polarity of a fourth subsidiary capacitor.

30. The method according to claim 29, modified in that the thyristor based full-bridge capacitor module does not include diodes but does include a plurality of additional thyristors, wherein the additional thyristors are fired at points where it is necessary for current to flow through the additional thyristors.

* * * * *